United States Patent
Nomura et al.

(10) Patent No.: US 11,066,332 B2
(45) Date of Patent: Jul. 20, 2021

(54) DIELECTRIC CERAMIC COMPOSITION AND CERAMIC ELECTRONIC COMPONENT

(71) Applicant: SHOEI CHEMICAL INC., Tokyo (JP)

(72) Inventors: Takeshi Nomura, Ome (JP); Atsushi Nemoto, Ome (JP); Yukari Sasaki, Ome (JP); Kazuhiko Takemoto, Ome (JP); Naomi Kinoshita, Ome (JP); Yumi Takahashi, Ome (JP)

(73) Assignee: SHOEI CHEMICAL INC., Tokyo (JP)

( * ) Notice: Subject to any disclaimer, the term of this patent is extended or adjusted under 35 U.S.C. 154(b) by 0 days.

(21) Appl. No.: 16/342,515

(22) PCT Filed: Oct. 11, 2017

(86) PCT No.: PCT/JP2017/036728
§ 371 (c)(1),
(2) Date: Apr. 16, 2019

(87) PCT Pub. No.: WO2018/074290
PCT Pub. Date: Apr. 26, 2018

(65) Prior Publication Data
US 2019/0241476 A1 Aug. 8, 2019

(30) Foreign Application Priority Data
Oct. 17, 2016 (JP) .............................. JP2016-203380

(51) Int. Cl.
*C04B 35/468* (2006.01)
*C04B 35/495* (2006.01)
(Continued)

(52) U.S. Cl.
CPC ............ *C04B 35/47* (2013.01); *C04B 35/468* (2013.01); *C04B 35/495* (2013.01);
(Continued)

(58) Field of Classification Search
CPC ... C04B 35/495; H01G 4/1227; H01G 4/1254
See application file for complete search history.

(56) References Cited

U.S. PATENT DOCUMENTS

| 2008/0045399 A1 | 2/2008 | Takeda et al. |
| 2019/0103222 A1* | 4/2019 | Aman ................ H01G 4/30 |

(Continued)

FOREIGN PATENT DOCUMENTS

| CN | 103288452 A | 9/2013 |
| JP | H03274607 A | 12/1991 |

(Continued)

OTHER PUBLICATIONS

Neurgaonkar, R. et al., "Ferroelectric Properties of the Tungsten Bronze M2+6M4+2Nb8O30 Solid Solution Systems," Materials Research Bulletin, vol. 27, No. 6, 1992, 8 pages.

(Continued)

*Primary Examiner* — Karl E Group
(74) *Attorney, Agent, or Firm* — Alleman Hall Creasman & Tuttle LLP

(57) ABSTRACT

According to the present invention, a dielectric ceramic composition, which can be fired in a reducing atmosphere, has a high dielectric constant, has an electrostatic capacity exhibiting little change, when used as a dielectric layer of a ceramic electronic component such as a laminated ceramic capacitor even under a condition of 150 to 200° C., and has small dielectric losses at 25° C. and 200° C., can be provided.

17 Claims, 4 Drawing Sheets

(51) Int. Cl.
  *H01G 4/12*  (2006.01)
  *C04B 35/47*  (2006.01)
  *H01G 4/30*  (2006.01)
  *H01B 3/12*  (2006.01)
  *C04B 35/499*  (2006.01)

(52) U.S. Cl.
  CPC ............ *C04B 35/499* (2013.01); *H01B 3/12* (2013.01); *H01G 4/12* (2013.01); *H01G 4/1227* (2013.01); *H01G 4/30* (2013.01); C04B 2235/3206 (2013.01); C04B 2235/3225 (2013.01); C04B 2235/3239 (2013.01); C04B 2235/3244 (2013.01); C04B 2235/3251 (2013.01); C04B 2235/3262 (2013.01); C04B 2235/3293 (2013.01); C04B 2235/3418 (2013.01); C04B 2235/6562 (2013.01); C04B 2235/76 (2013.01); C04B 2235/96 (2013.01)

(56) References Cited

U.S. PATENT DOCUMENTS

| | | | | |
|---|---|---|---|---|
| 2019/0115154 A1* | 4/2019 | Aman | .................... | C04B 35/638 |
| 2019/0256425 A1* | 8/2019 | Akiba | .................... | C04B 35/499 |

FOREIGN PATENT DOCUMENTS

| | | | |
|---|---|---|---|
| JP | H11043370 | A | 2/1999 |
| JP | 2000169215 | A | 6/2000 |
| JP | 2002211975 | A | 7/2002 |
| JP | 2007197277 | A | 8/2007 |
| JP | 2008189487 | A | 8/2008 |
| JP | 2012169635 | A | 9/2012 |
| JP | 2013063874 | A | 4/2013 |
| JP | 2013180906 | A | 9/2013 |
| JP | 2013180907 | A | 9/2013 |
| JP | 2013180908 | A | 9/2013 |
| JP | 2014062032 | A | 4/2014 |
| JP | 2015163576 | A | 9/2015 |
| KR | 100808472 | A1 | 3/2008 |
| TW | 209210 | B | 7/1993 |
| WO | 2006114914 | A1 | 11/2006 |
| WO | 2008102608 | A1 | 8/2008 |

OTHER PUBLICATIONS

Chen X.M. et al., "Low loss dielectrics of $Ba_6Ti_2Ta_8O_{30}$ and $Sr_6Ti_2Ta_8O_{30}$ with tungsten-bronze structure," Journal of Applied Psysics, Mar. 25, 2005, 4 pages.

Massarotti V. et al., Structural and Spectroscopic Properties of Pure and Doped $Ba_6Ti_2Nb_8O_{30}$ Tungsten Bronze, Journal of Physics and Chemistry, Jul. 13, 2006, 8 pages.

Massarotti V. et al., "Tungsten Bronzes Framework as a Glasslike Host for Transition Cations: The Case of $Ba_6Zr_2Ta_8O_{30}$," Journal of Physics and Chemistry, Mar. 8, 2007, 5 pages.

Zhang S. et al., "Structural Evolving Sequence and Porous $Ba_6Zr_2Nb_8O_{30}$ Ferroelectric Ceramics with Ultrahigh. Breakdown Field and Zero Strain," Journal of the American Chemical Society, Oct. 11, 2012, 6 pages.

Neurgaonkar R. et al., "Ferroelectric Properties of the Tungsten Bronze $M2+6M4+2Nb_8O_{30}$ Solid Solution Systems," Materials Research Bulletin, Mar. 25, 1992, 8 pages.

Yuan Y. et al., "Diffused ferroelectrics of $Ba_6Ti_2Nb_8O_{30}$ and $SDr_6Ti_2Nb_8O_{30}$ with filled tungsten-bronze structure," Journal of Applied Psysics, Oct. 28, 2005, 5 pages.

European Patent Office, Extended European Search Report Issued in Application No. 17863145.3, dated Sep. 9, 2020, Germany, 14 pages.

Taiwan Intellectual Property Office, Office Action and Search Report Issued in Application No. 11020137590, dated Feb. 17, 2021, 29 pages.

China National Intellectual Property Administration, Office Action and Search Report Issued in Application No. 201780062201.6, dated Apr. 6, 2021, 18 pages.

* cited by examiner 2 theta / deg. (CuKα)

DIELECTRIC CERAMIC COMPOSITION AND CERAMIC ELECTRONIC COMPONENT

TECHNICAL FIELD

The present invention relates to a dielectric ceramic composition and a ceramic electronic component using the dielectric ceramic composition as a dielectric layer.

BACKGROUND ART

In recent years, demands for an electronic component operating in a high-temperature environment exceeding 150° C. have been growing year by year, for equipment to be mounted in a harsh temperature environment, such as surroundings of the engine room of an automobile. Particularly, in the recent automobile market, electronic control of various functions is advancing rapidly with the aim of improving safety and ecological performance, and the attach rate of the electronic equipment is increasing. In particular, since the electronic equipment mounted in the engine room is exposed to a harsh temperature environment, high heat resistance is required for the electronic component in addition to high reliability.

Conventionally, as a ceramic electronic component such as a capacitor that satisfies the above requirement, a ceramic composition exhibiting paraelectricity (paraelectric material) such as calcium zirconate has been used for the dielectric layer. However, in the case of an electronic component having a dielectric layer made of a paraelectric material, the dielectric constant of the ceramic composition is low, and a capacitor with high capacity cannot be obtained.

Although barium titanate ($BaTiO_3$), which is known as a typical ceramic composition for a ceramic capacitor, has a high dielectric constant, the dielectric constant has a peak at a characteristic temperature called ferroelectric transition temperature, and the properties rapidly decline when the temperature reaches 120° C. or higher.

Therefore, development of a dielectric ceramic composition having a high dielectric constant even in a high-temperature environment (for example, 150° C. or higher) has been demanded.

In recent years, a base metal such as nickel or copper is often used as the material for an internal electrode in a ceramic electronic component. When a base metal is used for an internal electrode layer, since the dielectric layer and the internal electrode are co-fired, the base metal as well as the ceramic composition constituting the dielectric layer is fired in a reducing atmosphere so that the base metal is not oxidized in firing.

In Non-Patent Literature 1, a dielectric ceramic composition having a tungsten bronze structure represented by Formula $M^{2+}_6 M^{4+}_2 Nb_8 O_{30}$ is described. According to this Non-Patent Literature 1, in order to obtain an experimental sample, raw materials for the ceramic composition are mixed, and fired at about 1000° C. for 15 hours, and the obtained product is ground, dried, molded, and further sintered at 1250 to 1350° C. for 5 to 6 hours.

Also in Patent Literatures 1 to 11, investigations on dielectric ceramic compositions having various tungsten bronze structures have been conducted.

CITATION LIST

Non-Patent Literature

Non-Patent Literature 1: Mat. Res. Bull., Vol. 27 (1992), pp. 677-684; R. R. Neurgaonkar, J. G. Nelson and J. R. Oliver

Patent Literature

Patent Literature 1: Japanese Patent Laid Open No. 2002-211975
Patent Literature 2: Japanese Patent Laid Open No. 2007-197277
Patent Literature 3: Japanese Patent Laid Open No. 11-043370
Patent Literature 4: Japanese Patent Laid Open No. 2000-169215
Patent Literature 5: Japanese Patent Laid Open No. 2008-189487
Patent Literature 6: International Publication No. WO 08/102608
Patent Literature 7: International Publication No. WO 06/114914
Patent Literature 8: Japanese Patent Laid Open No. 2013-180906
Patent Literature 9: Japanese Patent Laid Open No. 2013-180907
Patent Literature 10: Japanese Patent Laid Open No. 2013-180908
Patent Literature 11: Japanese Patent Laid Open No. 2012-169635

DISCLOSURE OF THE INVENTION

Technical Problem

Although in Non-Patent Literature 1 the characteristics of a dielectric ceramic composition itself, which has a tungsten bronze structure, have been studied from an academic viewpoint, no consideration has been given to its application. That is, in Non-Patent Literature 1, the dielectric ceramic composition is fired in a laboratory in a normal environmental atmosphere. However, as a result of detailed investigation by the present inventors on a dielectric ceramic composition having the tungsten bronze structure represented by the above Formula, it was found that, when firing and sintering were performed in a reducing atmosphere as required recently for a dielectric ceramic composition together with a specific additive component, a dielectric ceramic composition having characteristics completely different from those reported in Non-Patent Literature 1 was obtained.

Meanwhile, in Patent Literatures 1 to 11, dielectric ceramic compositions having a tungsten bronze structure have been also studied. However, none of them exhibit at the same time the working effects of "firing in a reducing atmosphere is possible," "a sufficiently high dielectric constant can be obtained," "dielectric properties are excellent in a wide temperature range," and "the dielectric loss is small."

Accordingly, an object of the present invention is to provide a dielectric ceramic composition which can be fired in a reducing atmosphere, has a high dielectric constant, has an electrostatic capacity exhibiting little change, when used as a dielectric layer of a ceramic electronic component such as a laminated ceramic capacitor even in a high-temperature environment, for example, under a condition of 150 to 200°

C., and has small dielectric losses at 25° C. and 200° C.; as well as a ceramic electronic component using the composition as a dielectric layer.

Solution to Problem

The object can be attained by the following inventions.

Namely, the invention (1) provides a dielectric ceramic composition comprising a first component and a second component, wherein the first component comprises: an oxide of Ca in a content of 0 to 35.85 mol % in terms of CaO; an oxide of Sr in a content of 0 to 47.12 mol % in terms of SrO; an oxide of Ba in a content of 0 to 51.22 mol % in terms of BaO; an oxide of Ti in a content of 0 to 17.36 mol % in terms of $TiO_2$; an oxide of Zr in a content of 0 to 17.36 mol % in terms of $ZrO_2$; an oxide of Sn in a content of 0 to 2.60 mol % in terms of $SnO_2$; an oxide of Nb in a content of 0 to 35.32 mol % in terms of $Nb_2O_5$; an oxide of Ta in a content of 0 to 35.32 mol % in terms of $Ta_2O_5$; and an oxide of V in a content of 0 to 2.65 mol % in terms of $V_2O_5$, at the specified content based on the total number of moles of the first component in terms of the above oxides;

the first component comprises as essential components at least one selected from an oxide of Ca, an oxide of Sr, and an oxide of Ba, at least one selected from an oxide of Ti and an oxide of Zr, and at least one selected from an oxide of Nb and an oxide of Ta; and wherein, based on the total number of moles of the first component in terms of the above oxides, the total content of an oxide of Ca in terms of CaO, an oxide of Sr in terms of SrO, and an oxide of Ba in terms of BaO is 48.72 to 51.22 mol %; the total content of an oxide of Ti in terms of $TiO_2$, an oxide of Zr in terms of $ZrO_2$, and an oxide of Sn in terms of $SnO_2$ is 15.97 to 17.36 mol %; and the total content of an oxide of Nb in terms of $Nb_2O_5$, an oxide of Ta in terms of $Ta_2O_5$, and an oxide of V in terms of $V_2O_5$ is 31.42 to 35.31 mol %; and the composition comprises at least an oxide of Mn as the second component The invention (2) provides the dielectric ceramic composition according to (1) above, wherein the content of the oxide of Mn in terms of MnO is 3.5% by mass or less based on the total mass of the first component in terms of the above oxides.

The invention (3) provides a dielectric ceramic composition comprising a first component and a second component, wherein the composition comprises a compound represented by the following Formula (1):

$$A_aM^1{}_bM^2{}_cO_d \quad (1)$$

wherein A is represented by Formula (2): $Ba_{1-x-y}Sr_xCa_y$ (2), wherein $0 \le x \le 0.920$ and $0 \le y \le 0.700$; $M^1$ is at least one selected from Ti, Zr, and Sn; $M^2$ is at least one selected from Nb, Ta, and V; and $5.70 \le a \le 6.30$, $1.90 \le b \le 2.10$, $7.20 \le c \le 8.80$, and $27.45 \le d \le 32.50$; provided that when Sn is contained, the content of an oxide of Sn in terms of $SnO_2$ based on the total number of moles of an oxide of Ti in terms of $TiO_2$, an oxide of Zr in terms of $ZrO_2$, and an oxide of Sn in terms of $SnO_2$ is 15 mol % or less; and when V is contained, the content of an oxide of V in terms of $V_2O_5$ based on the total number of moles of an oxide of Nb in terms of $Nb_2O_5$, an oxide of Ta in terms of $Ta_2O_5$, and an oxide of V in terms of $V_2O_5$ is 7.5 mol % or less, as the first component; and the composition comprises an oxide of Mn as the second component.

The invention (4) provides the dielectric ceramic composition according to (3) above, wherein the content of the oxide of Mn in terms of MnO is 3.5% by mass or less based on the mass of the compound represented by the Formula (1).

The invention (5) provides a dielectric ceramic composition comprising a first component and a second component, wherein:

the composition comprises a compound represented by the following Formula (3):

$$\alpha \cdot Ca_{\eta1}M^3{}_{\theta1}M^4{}_{\phi1}O_{\omega1} - \beta \cdot Sr_{\eta2}M^3{}_{\theta2}M^4{}_{\phi2}O_{\omega2} - \gamma \cdot Ba_{\eta3}M^3{}_{\theta3}M^4{}_{\phi3}O_{\omega3} \quad (3)$$

wherein $\eta1$, $\eta2$, and $\eta3$ are each independently a value within a range of 5.70 to 6.30; $\theta1$, $\theta2$, and $\theta3$ are each independently a value within a range of 0.95 to 1.05; $\phi1$, $\phi2$, and $\phi43$ are each independently a value within a range of 0.90 to 1.10; $\omega1$, $\omega2$, and $\omega3$ are each independently a value within a range of 27.45 to 32.50; $M^3$ is represented by Formula (4): $Ti_{2-\rho-\sigma}Zr_\rho Sn_\sigma$ (4), wherein $0 \le \rho \le 2.0$ and $0 \le \sigma \le 0.3$; $M^4$ is represented by Formula (5): $Nb_{8-\pi-\phi}Ta_\pi V_\phi$ (5), wherein $0 \le \pi \le 8.0$ and $0 \le \phi \le 0.6$; $\alpha$, $\beta$, and $\gamma$ satisfy $\alpha + \beta + \gamma = 1.00$, and wherein, when an arbitrary point on a ternary composition diagram is expressed as ($\alpha$, $\beta$, $\gamma$), the compound exists in the region surrounded by line segments joining point A=(0.05, 0.95, 0.00), point B=(0.70, 0.30, 0.00), point C=(0.70, 0.00, 0.30), point D=(0.00, 0.00, 1.00), and point E=(0.00, 0.90, 0.10), as the first component; and the composition comprises an oxide of Mn as the second component.

The invention (6) provides the dielectric ceramic composition according to (5) above, wherein the content of the oxide of Mn in terms of MnO is 3.5% by mass or less based on the mass of the compound existing in the region surrounded by the line segments joining the point A, the point B, the point C, the point D, and the point E on the ternary composition diagram.

The invention (7) provides the dielectric ceramic composition according to (5) above, wherein the first component is a compound existing in the region surrounded by the line segments joining point A'=(0.05, 0.95, 0.00), point B'=(0.60, 0.40, 0.00), point C'=(0.70, 0.20, 0.10), point D'=(0.70, 0.10, 0.20), point E'=(0.55, 0.00, 0.45), point F'=(0.40, 0.00, 0.60), point G'=(0.10, 0.10, 0.80), point H'=(0.00, 0.00, 1.00), point I'=(0.00, 0.40, 0.60), point J'=(0.20, 0.40, 0.40), point K'=(0.00, 0.70, 0.30), and point L'=(0.00, 0.90, 0.10) in the ternary composition diagram.

The invention (8) provides the dielectric ceramic composition according to any one of (1) to (7) above comprising an oxide of Mn and an oxide of D, wherein D is at least one selected from Li, Mg, Si, Cr, Al, Fe, Co, Ni, Cu, Zn, Ga, Ge, In, W, Mo, Y, Hf, La, Ce, Pr, Nd, Sm, Eu, Gd, Tb, Dy, Ho, Er, Tm, Yb, and Lu as the second component.

The invention (9) provides the dielectric ceramic composition according to any one of (1) to (8) above having a tungsten bronze-type crystal phase.

The invention (10) provides the dielectric ceramic composition according to any one of (1) to (9) above, wherein the dielectric constant at 25° C. is 100 or more.

The invention (11) provides the dielectric ceramic composition according to (10) above, wherein the dielectric constant at 25° C. is 200 or more.

The invention (12) provides the dielectric ceramic composition according to (11) above, wherein the dielectric constant at 25° C. is 300 or more.

The invention (13) provides the dielectric ceramic composition according to any one of (1) to (12) above, wherein the change rate of electrostatic capacity in a temperature range of −55° C. to 200° C. is in a range of −50%/% to 500%.

The invention (14) provides the dielectric ceramic composition according to any one of (1) to (13) above, wherein the change rate of the electrostatic capacity in a temperature range of −55° C. to 200° C. is in a range of −33% to 22%.

The invention (15) provides the dielectric ceramic composition according to any one of (1) to (14) above, wherein the dielectric loss (tan δ) at 25° C. is 10% or less, and the dielectric loss (tan δ) at 200° C. is 10% or less.

The invention (16) provides a ceramic electronic component comprising a dielectric layer formed of the dielectric ceramic composition according to any one of (1) to (15) above, and an electrode layer containing a base metal as a conductive component.

The invention (17) provides the ceramic electronic component according to (16) above, wherein the base metal is at least one selected from nickel and copper.

The invention (18) provides the ceramic electronic component according to (16) or (17) above, wherein a plurality of the dielectric layers, and a plurality of the electrode layers are laminated.

Advantageous Effects of Invention

According to the present invention, a dielectric ceramic composition, which can be fired in a reducing atmosphere, has a high dielectric constant, in which the electrostatic capacity exhibits little change when used as a dielectric layer of a ceramic electronic component such as a laminated ceramic capacitor, even under a high-temperature condition of 150 to 200° C., and the change rate of electrostatic capacity in a temperature range of −55° C. to 200° C. is in a range of −50 to 50% (hereinafter occasionally referred to as ±50%), and for which the dielectric losses at 25° C. and 200° C. are small, as well as a ceramic electronic component using the composition as a dielectric layer, can be provided.

DESCRIPTION OF EMBODIMENTS

Figure 1:
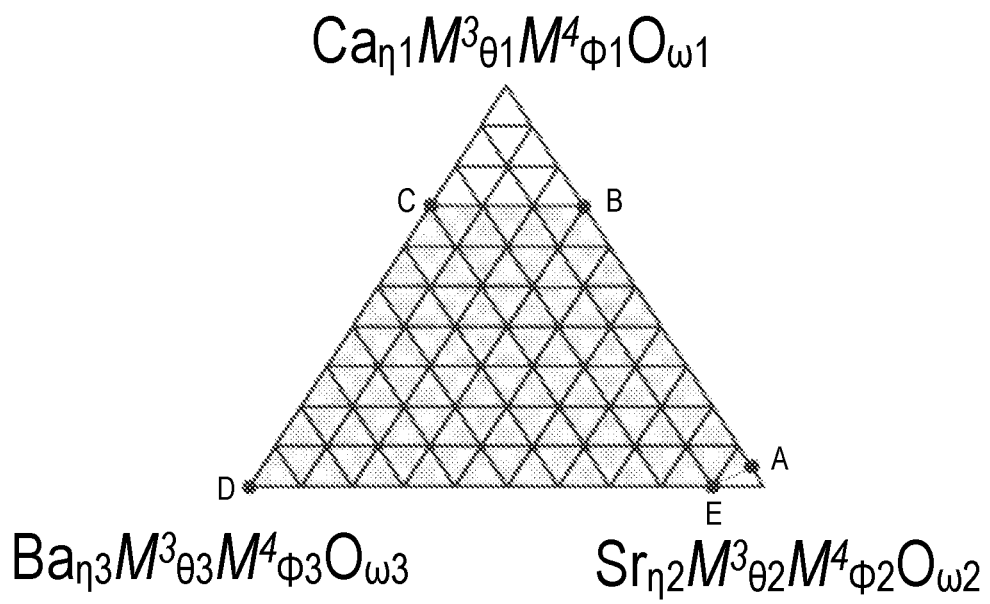
FIG. 1 is a triangular diagram indicating a preferable composition range of a dielectric ceramic composition according to the present invention.

The present invention will be described based on the Embodiments shown in the drawings. A numerical range expressed by "x to y" or "between x and y" includes herein the values of x and y in the range, unless otherwise specified.

(Ceramic Capacitor 1)

Figure 8:
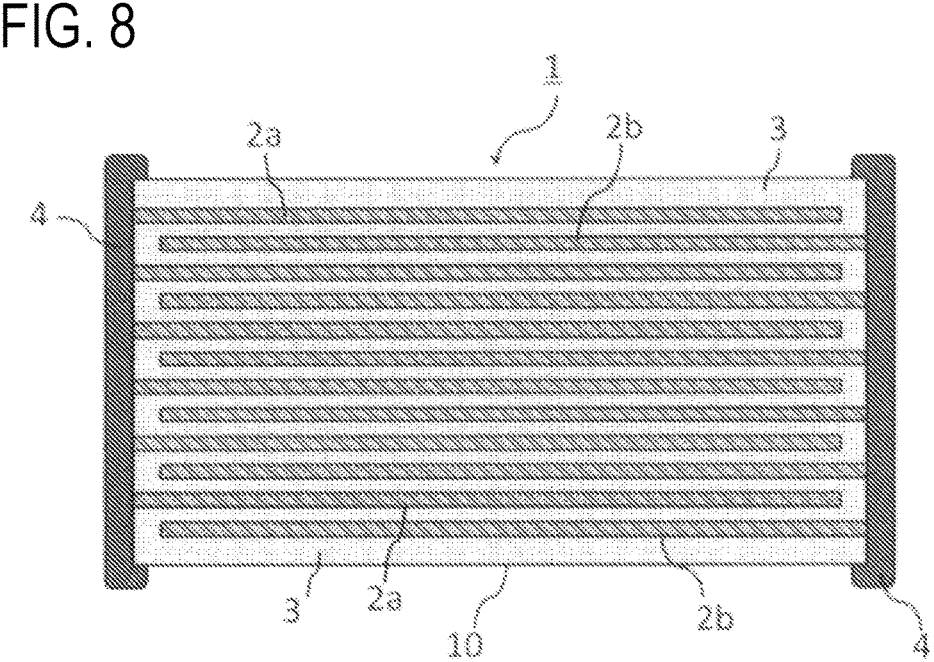
FIG. 8 is a schematic cross-sectional view of a ceramic capacitor.

The ceramic capacitor 1 shown in FIG. 8 is provided with a laminated body 10 having a rectangular parallelepiped shape as a whole. The laminated body 10 is constituted with a plurality of stacked dielectric layers 3 and a plurality of internal electrodes 2a and 2b formed along different interfaces of the dielectric layers 3. The internal electrodes 2a and 2b are alternately arranged in the laminated body 10, and are electrically connected with the external electrodes 4 at different ends of the laminated body 10. On the external electrode 4, if necessary, a first plated layer made of nickel, copper, a nickel-copper alloy, or the like may be formed, and further thereon a second plated layer made of solder, tin, or the like may be formed.

As described above, a plurality of internal electrodes 2a and 2b are formed stacking one on another in the laminating direction of the laminated body 10, so that the electric charge is accumulated in the spaces between the adjacent internal electrodes 2a and 2b. The electric charge is taken out by electrically connecting the internal electrodes 2a and 2b with the external electrodes 4.

(Internal Electrodes 2A and 2B)

According to the present invention, a base metal is used as a conductive component for the internal electrodes 2a and 2b. As the base metal for a conductive component, besides a pure metal, such as nickel, copper, and aluminum, an alloy, a mixture, or a compound containing the metal component may be used. As the base metal for the conductive component, one selected from nickel and copper is particularly preferable. In this regard, insofar as the working effects of the present invention are not impaired, the internal electrodes 2a and 2b may contain a conductive component other than the base metal, an inhibitor described later, or the like.

The internal electrodes 2a, and 2b may be formed by any approach, and there is for example a forming method using a conductive paste obtained by kneading a metal powder including the base metal together with a binder component. When the conductive paste is used, as a method for forming the internal electrodes 2a and 2b, a printing method such as screen printing is particularly preferable. In this case, the conductive paste may contain a powder of a dielectric ceramic composition having the same composition as the dielectric ceramic composition of the present invention described later as a so-called inhibitor for controlling the sintering of the metal powder. The internal electrodes 2a and 2b may be also formed by another publicly known approach, such as an inkjet method, a vapor deposition method, or a plating method.

(Dielectric Layer 3)

When a dielectric layer 3 is composed of a dielectric ceramic composition of the present invention described later, the electrostatic capacity changes little over a wide temperature range, particularly even in a high-temperature range around 200° C., and the change rate of the electrostatic capacity falls within +50% in a temperature range of −55° C. to 200° C., and further dielectric losses (tan δ) both at 25° C. and 200° C. may be 10% or less, while maintaining a high dielectric constant. Furthermore, the dielectric ceramic composition of the present invention is excellent in reduction resistance, so that it is hardly reduced and transformed to a semiconductor, even when a base metal is used for the conductive component of the internal electrode, and co-firing is carried out in a reducing atmosphere.

(Dielectric Ceramic Composition)

The dielectric ceramic composition of the first embodiment of the present invention comprises a first component and a second component, wherein:

the first component comprises at the respectively specified content ranges based on the total number of moles of the first component in terms of the following oxides: an oxide of Ca in a content of 0 to 35.85 mol % in terms of CaO; an oxide of Sr in a content of 0 to 47.12 mol % in terms of SrO; an oxide of Ba in a content of 0 to 51.22 mol % in terms of BaO; an oxide of Ti in a content of 0 to 17.36 mol % in terms of $TiO_2$; an oxide of Zr in a content of 0 to 17.36 mol % in terms of $ZrO_2$; an oxide of Sn in a content of 0 to 2.60 mol % in terms of $SnO_2$; an oxide of Nb in a content of 0 to 35.32 mol % in terms of $Nb_2O_5$; an oxide of Ta in a content of 0 to 35.32 mol % in terms of $Ta_2O_5$; and an oxide of V in a content of 0 to 2.65 mol % in terms of $V_2O_5$;

the first component comprises as essential components at least one selected from an oxide of Ca, an oxide of Sr, and an oxide of Ba, at least one selected from an oxide of Ti and an oxide of Zr, and at least one selected from an oxide of Nb and an oxide of Ta; and wherein, based on the total number of moles of the first component in terms of the above oxides, the total content of an oxide of Ca in terms of CaO, an oxide of Sr in terms of SrO, and an oxide of Ba in terms of BaO is 48.72 to 51.22 mol %; the total content of an oxide of Ti in terms of $TiO_2$, an oxide of Zr in terms of $ZrO_2$, and an oxide of Sn in terms of $SnO_2$ is 15.97 to 17.36 mol %; and the total content of an oxide of Nb in terms of $Nb_2O_5$, an oxide of Ta in terms of $Ta_2O_5$, and an oxide of V in terms of $V_2O_5$ is 31.42 to 35.31 mol %; and the composition comprises at least an oxide of Mn as the second component.

The dielectric ceramic composition of the first embodiment of the present invention comprises a first component and a second component. In the dielectric ceramic composition of the first embodiment of the present invention, among oxides contained in the dielectric ceramic composition, the oxides other than those contained as the first component are all included as the second component.

The first component with respect to the dielectric ceramic composition of the first embodiment of the present invention is composed of one or more selected from an oxide of Ca, an oxide of Sr, and an oxide of Ba as essential components, one or more selected from an oxide of Ti and an oxide of Zr, one or more selected from an oxide of Nb and an oxide of Ta, and as an optional component one or more selected from an oxide of Sn, and an oxide of V.

As for the content of each oxide in the first component in the dielectric ceramic composition of the first embodiment of the present invention in terms of a content based on the total number of moles of the first component in terms of the following oxides: the content of an oxide of Ca is 0 to 35.85 mol % in terms of CaO; the content of an oxide of Sr is 0 to 47.12 mol % in terms of SrO; the content of an oxide of Ba is 0 to 51.22 mol % in terms of BaO; the content of an oxide of Ti is 0 to 17.36 mol % in terms of $TiO_2$; the content of an oxide of Zr is 0 to 17.36 mol % in terms of $ZrO_2$; the content of an oxide of Sn is 0 to 2.60 mol % in terms of $SnO_2$; the content of an oxide of Nb is 0 to 35.32 mol % in terms of $Nb_2O_5$; the content of an oxide of Ta is 0 to 35.32 mol % in terms of $Ta_2O_5$; and the content of an oxide of V is 0 to 2.65 mol % in terms of $V_2O_5$.

In the dielectric ceramic composition of the first embodiment of the present invention, the total content of an oxide of Ca in terms of CaO, an oxide of Sr in terms of SrO, and an oxide of Ba in terms of BaO based on the total number of moles of the first component in terms of the above oxides is 48.72 to 51.22 mol %, and preferably 49.37 to 50.62 mol %.

Further, in the dielectric ceramic composition of the first embodiment of the present invention, the total content of an oxide of Ti in terms of $TiO_2$, an oxide of Zr in terms of $ZrO_2$, and an oxide of Sn in terms of $SnO_2$ based on the total number of moles of the first component in terms of the above oxides is 15.97 to 17.36 mol %, and preferably 16.32 to 17.01 mol %. When the first component contains Sn, the content of an oxide of Sn in terms of $SnO_2$ based on the total number of moles of an oxide of Ti in terms of $TiO_2$, an oxide of Zr in terms of $ZrO_2$, and an oxide of Sn in terms of $SnO_2$ is 15 mol % or less.

Further, in the dielectric ceramic composition of the first embodiment of the present invention, the total content of an oxide of Nb in terms of $Nb_2O_5$, an oxide of Ta in terms of $Ta_2O_5$, and an oxide of V in terms of $V_2O_5$ based on the total number of moles of the first component in terms of the above oxides is 31.42 to 35.31 mol %, and preferably 32.20 to 34.43 mol %. When the first component contains V, the content of an oxide of V in terms of $V_2O_5$ based on the total number of moles of an oxide of Nb in terms of $Nb_2O_5$, an oxide of Ta in terms of $Ta_2O_5$, and an oxide of V in terms of $V_2O_5$ is 7.5 mol % or less.

The dielectric ceramic composition of the first embodiment of the present invention contains at least an oxide of Mn as the second component. In other words, the dielectric ceramic composition of the first embodiment of the present invention contains an oxide of Mn as an essential second component. When the dielectric ceramic composition of the first embodiment of the present invention contains an oxide of Mn as the second component, when it is used as a dielectric layer of a ceramic electronic component such as a laminated ceramic capacitor, as compared with the case where no oxide of Mn is contained, the change in electrostatic capacity is small even under a high-temperature condition of 150 to 200° C., the change rate of the electrostatic capacity rate falls within ±50% in the temperature range of −55° C. to 200° C., and the dielectric losses (hereinafter occasionally simply referred to as tan δ) at 25° C. and 200° C. become small.

As for the content of an oxide of Mn as the second component, the content of an oxide of Mn in terms of MnO with respect to the total mass of the first component in terms of the above oxides is more than 0% by mass, preferably more than 0% by mass and not more than 3.5% by mass, particularly preferably 0.005 to 2.0% by mass, and further preferably 0.01 to 1.5% by mass. When the content of the oxide of Mn exceeds the above range, in some cases the dielectric loss tends to increase easily at high temperature, or the change of the electrostatic capacity tends to increase.

The dielectric ceramic composition of the first embodiment of the present invention contains as essential components an oxide of Mn as the second component, and may optionally further contain an oxide other than the oxide of Mn. The second component is added to a dielectric ceramic composition of the present invention in order to improve reduction resistance and other properties. The ratio of the total mass of the second component in terms of oxides based on the total mass of the first component in terms of the above oxides is preferably 10% by mass or less, and particularly preferably 0.1 to 5.5% by mass.

As the optional component of the second component contained in the dielectric ceramic composition of the first embodiment of the present invention, an oxide of D (D is at least one selected from Li, Mg. Si, Cr, Al, Fe, Co, Ni, Cu, Zn, Ga, Ge, In, W, Mo, Y, Hf, La, Ce, Pr, Nd, Sm, Eu, Gd, Tb, Dy, Ho, Er, Tm, Yb, and Lu) is preferable, and an oxide of Mg, an oxide of Si, and an oxide of Y are particularly preferable.

When the dielectric ceramic composition of the first embodiment of the present invention contains an oxide of Mn and an oxide of D as the second component, as for the total content of an oxide of Mn and an oxide of D, the ratio of the total mass of the oxide of Mn in terms of MnO and the oxide of D based on the total mass of the first component in terms of the above oxides is preferably 6 mass % or less, and particularly preferably 0.1 to 2.5% by mass. In this regard, the mass of the oxide of D is a value for Li in terms of $Li_2O$, for Mg in terms of MgO, for Si in terms of $SiO_2$, for Cr in terms of $Cr_2O_3$, for Al in terms of $Al_2O_3$, for Fe in terms of $Fe_2O_3$, for Co in terms of CoO, for Ni in terms of NiO, for Cu in terms of CuO, for Zn in terms of ZnO, for Ga in terms of $Ga_2O_3$, for Ge in terms of $GeO_2$, for In in terms of $In_2O_3$, for W in terms of $WO_3$, for Mo in terms of $MoO_3$, for Y in terms of $Y_2O_3$, for Hf in terms of $HfO_2$, for La in terms of $La_2O_3$, for Ce in terms of $CeO_2$, for Pr in terms of $Pr_6O_{11}$, for Nd in terms of $Nd_2O_3$, for Sm in terms of $Sm_2O_3$, for Eu in terms of $Eu_2O_3$, for Gd in terms of $Gd_2O_3$, for Tb in terms of $Tb_4O_7$, for Dy in terms of $Dy_2O_3$, for Ho in terms of $Ho_2O_3$, for Er in terms of $Er_2O_3$, for Tm in terms of $Tm_2O_3$, for Yb in terms of $Yb_2O_3$, and for Lu in terms of $Lu_2O_3$.

The dielectric ceramic composition of the first embodiment of the present invention preferably shows the presence of a tungsten bronze-type crystal phase when a crystal structure analysis such as X-ray diffraction is conducted. The average grain size of the dielectric ceramic composition of the first embodiment of the present invention is preferably 5 μm or less, and particularly preferably 3 μm or less.

The dielectric ceramic composition of the second embodiment of the present invention comprises a first component and a second component, wherein:

the composition comprises a compound represented by the following Formula (1):

$$A_a M^1_b M^2_c O_d \quad (1)$$

wherein A is represented by Formula (2):

$$Ba_{1-x-y}Sr_xCa_y \quad (2),$$

wherein $0 \leq x \leq 0.920$ and $0 \leq y \leq 0.700$; $M^1$ is at least one selected from Ti, Zr, and Sn; $M^2$ is at least one selected from Nb, Ta, and V; and $5.70 \leq a \leq 6.30$, $1.90 \leq b \leq 2.10$, $7.20 \leq c \leq 8.80$, and $27.45 \leq d \leq 32.50$; provided that when Sn is contained, the content of an oxide of Sn in terms of $SnO_2$ based on the total number of moles of an oxide of Ti in terms of $TiO_2$, an oxide of Zr in terms of $ZrO_2$, and an oxide of Sn in terms of $SnO_2$ is 15 mol % or less; and when V is contained, the content of an oxide of V in terms of $V_2O_5$ based on the total number of moles of an oxide of Nb in terms of $Nb_2O_5$, an oxide of Ta in terms of $Ta_2O_5$, and an oxide of V in terms of $V_2O_5$ is 7.5 mol % or less, as the first component; and the composition comprises an oxide of Mn as the second component.

The dielectric ceramic composition of the second embodiment of the present invention comprises a first component and a second component. In the dielectric ceramic composition of the second embodiment of the present invention, among oxides contained in the dielectric ceramic composition, the oxides other than those contained as the first component are all included as the second component.

In the dielectric ceramic composition of the second embodiment of the present invention, the first component is a compound represented by the following Formula (1):

$$A_a M^1_b M^2_c O_d \quad (1)$$

In Formula (1), A is represented by Formula (2):

$$Ba_{1-x-y}Sr_xCa_y \quad (2)$$

(In Formula (2): $0 \leq x \leq 0.920$ and $0 \leq y \leq 0.700$). In other words, A may be Ba alone, a combination of any of two selected from Ca, Sr, and Ba (Ca and Sr, Ca and Ba, Sr and Ba), or a combination of Ca, Sr, and Ba.

In Formula (1), $M^1$ is at least one selected from Ti, Zr, and Sn. However, one or more selected from Ti and Zr is essential for $M^1$. In other words, $M^1$ is Ti alone, Zr alone, a combination of Ti and Sn, a combination of Zr and Sn, a combination of Ti and Zr, or a combination of Ti, Zr, and Sn.

In Formula (1), $M^2$ is at least one selected from Nb, Ta and V. However, one or more selected from Nb and Ta is essential for $M^2$. In other words, $M^2$ is Nb alone, Ta alone, a combination of Nb and V, a combination of Ta and V, a combination of Nb and Ta, or a combination of Nb, Ta, and V.

In Formula (1), a is in a range of $5.70 \leq a \leq 6.30$, b is in a range of $1.90 \leq b \leq 2.10$, c is in a range of $7.20 \leq c \leq 8.80$, and d is $27.45 \leq d \leq 32.50$.

When the dielectric ceramic composition of the second embodiment of the present invention contains Sn, the content of an oxide of Sn in terms of $SnO_2$ based on the total number of moles of an oxide of Ti in terms of $TiO_2$, an oxide of Zr in terms of $ZrO_2$, and an oxide of Sn in terms of $SnO_2$ is 15 mol % or less. When the dielectric ceramic composition of the second embodiment of the present invention contains V, the content of an oxide of V in terms of $V_2O_5$ based on the total number of moles of an oxide of Nb in terms of $Nb_2O_5$, an oxide of Ta in terms of $Ta_2O_5$, and an oxide of V in terms of $V_2O_5$ is 7.5 mol % or less.

The dielectric ceramic composition of the second embodiment of the present invention contains at least an oxide of Mn as the second component. In other words, the dielectric ceramic composition of the second embodiment of the present invention contains an oxide of Mn as an essential second component. When the dielectric ceramic composition of the second embodiment of the present invention contains an oxide of Mn as the second component, when it is used as a dielectric layer of a ceramic electronic component such as a laminated ceramic capacitor, as compared with the case where no oxide of Mn is contained, the change in electrostatic capacity is small even under a high-temperature condition of 150 to 200° C., the change rate of the electrostatic capacity rate falls within ±50% in the temperature range of −55° C. to 200° C., and the dielectric losses at 25° C. and 200° C. become small.

As for the content of an oxide of Mn as the second component, the content of an oxide of Mn in terms of MnO based on the mass of the compound represented by Formula (1) ($A_a M^1_b M^2_c O_d$ (1)) is more than 0% by mass, preferably more than 0% by mass but not more than 3.5% by mass, more preferably 0.005 to 2.0/o by mass, and further preferably 0.01 to 1.5% by mass. When the content of the oxide of Mn exceeds the above range, in some cases the dielectric loss tends to increase easily at high temperature, or the change of the electrostatic capacity tends to increase.

The dielectric ceramic composition of the second embodiment of the present invention contains as essential components an oxide of Mn as the second component, and may optionally further contain an oxide other than the oxide of Mn. The second component is added to a dielectric ceramic composition of the present invention in order to improve reduction resistance and other properties. The ratio of the total mass of the second component in terms of oxides based on the mass of the compound represented by Formula (1) ($A_a M^1_b M^2_c O_d$ (1)) is preferably 10% by mass or less, and particularly preferably 0.1 to 5.5% by mass.

As the optional component of the second component contained in the dielectric ceramic composition of the second embodiment of the present invention, an oxide of D (D is at least one selected from Li, Mg, Si, Cr, Al, Fe, Co, Ni, Cu, Zn, Ga, Ge, In, W, Mo, Y, Hf, La, Ce, Pr, Nd, Sm, Eu, Gd, Tb, Dy, Ho, Er, Tm, Yb, and Lu) is preferable, and an oxide of Mg, an oxide of Si, and an oxide of Y are particularly preferable.

When the dielectric ceramic composition of the second embodiment of the present invention contains an oxide of Mn and an oxide of D as the second component, as for the total content of an oxide of Mn and an oxide of D, the ratio of the total mass of the oxide of Mn in terms of MnO and the oxide of D based on the mass of the compound represented by Formula (1) ($A_aM^1_bM^2_cO_d$ (1)) is preferably 10% by mass or less, and particularly preferably 0.1 to 5.5% by mass. In this regard, the mass of the oxide of D is a value for Li in terms of $Li_2O$, for Mg in terms of MgO, for Si in terms of $SiO_2$, for Cr in terms of $Cr_2O_3$, for Al in terms of $Al_2O_3$, for Fe in terms of $Fe_2O_3$, for Co in terms of CoO, for Ni in terms of NiO, for Cu in terms of CuO, for Zn in terms of ZnO, for Ga in terms of $Ga_2O_3$, for Ge in terms of $GeO_2$, for In in terms of $In_2O_3$, for W in terms of $WO_3$, for Mo in terms of $MoO_3$, for Y in terms of $Y_2O_3$, for Hf in terms of $HfO_2$, for La in terms of $La_2O_3$, for Ce in terms of $CeO_2$, for Pr in terms of $Pr_6O_{11}$, for Nd in terms of $Nd_2O_3$, for Sm in terms of $Sm_2O_3$, for Eu in terms of $Eu_2O_3$, for Gd in terms of $Gd_2O_3$, for Tb in terms of $Tb_4O_7$, for Dy in terms of $Dy_2O_3$, for Ho in terms of $Ho_2O_3$, for Er in terms of $Er_2O_3$, for Tm in terms of $Tm_2O_3$, for Yb in terms of $Yb_2O_3$, and for Lu in terms of $Lu_2O_3$.

The dielectric ceramic composition of the second embodiment of the present invention shows the presence of a tungsten bronze-type crystal phase, when a crystal structure analysis such as X-ray diffraction is conducted, and the average grain size thereof is preferably 5 μm or less, and particularly preferably 3 μm or less.

The dielectric ceramic composition of the third embodiment of the present invention comprises a first component and a second component, wherein:

the composition comprises a compound represented by the following Formula (3):

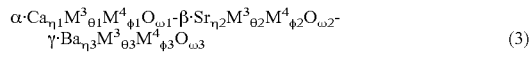

$$\alpha \cdot Ca_{\eta 1}M^3_{\theta 1}M^4_{\phi 1}O_{\omega 1} - \beta \cdot Sr_{\eta 2}M^3_{\theta 2}M^4_{\phi 2}O_{\omega 2} - \gamma \cdot Ba_{\eta 3}M^3_{\theta 3}M^4_{\phi 3}O_{\omega 3} \quad (3)$$

[In Formula (3), η1, η12, and η13 are each independently a value within a range of 5.70 to 6.30. θ1, θ2, and θ3 are each independently a value within a range of 0.95 to 1.05. ϕ1, ϕ2, and ϕ3 are each independently a value within a range of 0.90 to 1.10. ω1, ω2, and ω3 are each independently a value within a range of 27.45 to 32.50. $M^3$ is represented by Formula (4):

$$Ti_{2-\rho-\sigma}Zr_\rho Sn_\sigma \quad (4)$$

In Formula (4), 0≤ρ≤2.0 and 0≤σ≤0.3). $M^4$ is represented by Formula (5):

$$Nb_{8-\pi-\phi}Ta_\pi V_\phi \quad (5)$$

(In Formula (5), 0≤π≤8.0 and 0≤ϕ≤0.6). The α, β, and γ satisfy α+β+γ=1.00], and wherein, when an arbitrary point on a ternary composition diagram is expressed as (α, β, γ), the compound exists in the region surrounded by line segments joining point A=(0.05, 0.95, 0.00), point B=(0.70, 0.30, 0.00), point C=(0.70, 0.00, 0.30), point D=(0.00, 0.00, 1.00), and point E=(0.00, 0.90, 0.10), as the first component; and the composition comprises an oxide of Mn as the second component.

The dielectric ceramic composition of the third embodiment of the present invention comprises a first component and a second component. In the dielectric ceramic composition of the third embodiment of the present invention, among oxides contained in the dielectric ceramic composition, the oxides other than those contained as the first component are all included as the second component.

When a point on the ternary composition diagram of $Ca_{\eta 1}M^3_{\theta 1}M^4_{\phi 1}O_{\omega 1}$-$Sr_{\eta 2}M^3_{\theta 2}M^4_{\phi 2}O_{\omega 2}$-$Ba_{\eta 3}M^3_{\theta 3}M^4_{\phi 3}O_{\omega 3}$ shown in FIG. 1 is expressed as (α, β, γ) (note that α, β, and γ satisfy α+β+γ=1.00), the first component of the dielectric ceramic composition of the third embodiment of the present invention is a compound existing in the region surrounded by line segments joining point A=(0.05, 0.95, 0.00), point B=(0.70, 0.30, 0.00), point C=(0.70, 0.00, 0.30), point D=(0.00, 0.00, 1.00), and point E=(0.00, 0.90, 0.10) (hereinafter also referred to as a compound existing in the region surrounded by line segments joining point A, point B, point C, point D, and point E on the ternary composition diagram shown in FIG. 1). When the composition of the first component is within the above region, the dielectric constant at 25° C. is 100 or more to indicate ferroelectricity.

Figure 2:
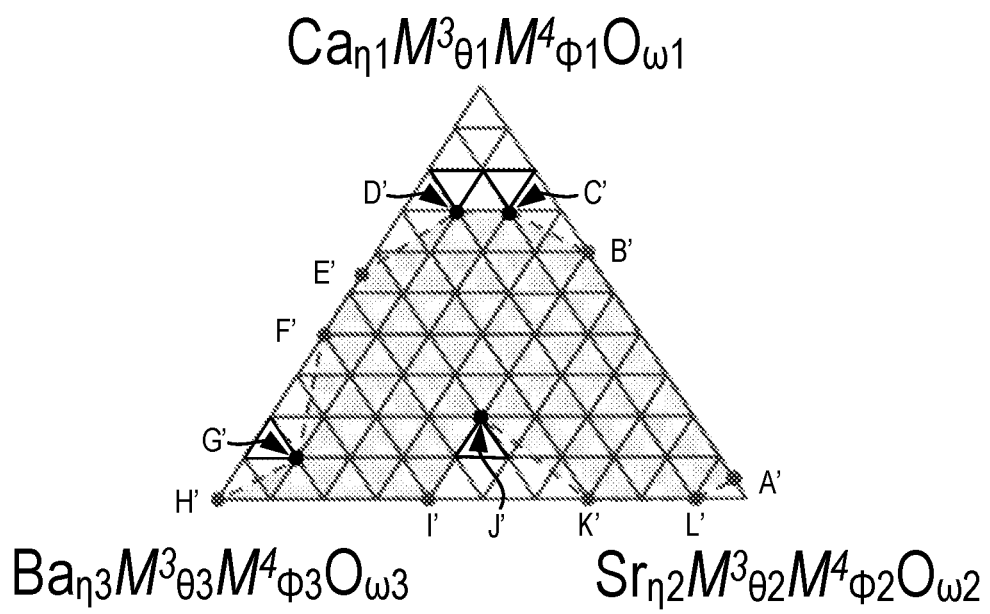
FIG. 2 is a triangular diagram indicating a more preferable composition range of a dielectric ceramic composition according to the present invention.

In the dielectric ceramic composition of the third embodiment of the present invention, the first component is preferably a compound existing in a region surrounded by line segments joining point A'=(0.05, 0.95, 0.00), point B'=(0.60, 0.40, 0.00), point C'=(0.70, 0.20, 0.10), point D'=(0.70, 0.10, 0.20), point E'=(0.55, 0.00, 0.45), point F'=(0.40, 0.00, 0.60), point G'=(0.10, 0.10, 0.80), point H'=(0.00, 0.00, 1.00), point I'=(0.00, 0.40, 0.60), point J'=(0.20, 0.40, 0.40), point K'=(0.00, 0.70, 0.30), and point L'=(0.00, 0.90, 0.10) on the ternary composition diagram of $Ca_{\eta 1}M^3_{\theta 1}M^4_{\phi 1}O_{\omega 1}$-$Sr_{\eta 2}M^3_{\theta 2}M^4_{\phi 2}O_{\omega 2}$-$Ca_{\eta 3}M^3_{\theta 3}M^4_{\phi 3}O_{\omega 3}$ shown in FIG. 2 (hereinafter also referred to as a compound existing in the region surrounded by line segments joining point A', point B', point C', point D', point E', point F', point G', point H', point I', point J', point K', and point L' on the ternary composition diagram shown in FIG. 2). When the composition of the first component is within the above region, the dielectric constant at 25° C. of 200 or more can be easily obtained to indicate ferroelectricity. In this regard, the ternary composition diagram of "$Ca_{\eta 1}M^3_{\theta 1}M^4_{\phi 1}O_{\omega 1}$-$Sr_{\eta 2}M^3_{\theta 2}M^4_{\phi 2}O_{\omega 2}$-$Ba_{\eta 3}M^3_{\theta 3}M^4_{\phi 3}O_{\omega 3}$" shown in FIG. 2 is the same as the ternary composition diagram of "$Ca_{\eta 1}M^3_{\theta 1}M^4_{\phi 1}O_{\omega 1}$-$Sr_{\eta 2}M^3_{\theta 2}M^4_{\phi 2}O_{\omega 2}$-$Ba_{\eta 3}M^3_{\theta 3}M^4_{\phi 3}O_{\omega 3}$" shown in FIG. 1.

However, in the ternary composition diagram of "$Ca_{\eta 1}M^3_{\theta 1}M^4_{\phi 1}O_{\omega 1}$-$Sr_{\eta 2}M^3_{\theta 2}M^4_{\phi 2}O_{\omega 2}$-$Ba_{\eta 3}M^3_{\theta 3}M^4_{\phi 3}O_{\omega 3}$" with respect to the dielectric ceramic composition of the third embodiment of the present invention, η1, η2, and η3 are each independently a value within a range of 5.70 to 6.30. θ1, θ2, and θ3 are each independently a value within a range of 0.95 to 1.05. ϕ1, ϕ2, and ϕ3 are each independently a value within a range of 0.90 to 1.10. ω1, ω2, and ω3 are each independently a value within a range of 27.45 to 32.50. $M^3$ is represented by Formula (4):

$$Ti_{2-\rho-\sigma}Zr_\rho Sn_\sigma \quad (4)$$

(in Formula (4), 0≤ρ≤2.0 and 0≤σ≤0.3). $M^4$ is represented by Formula (5):

$$Nb_{8-\pi-\phi}Ta_\pi V_\phi \quad (5)$$

(in Formula (5), 0≤π≤8.0 and 0≤ϕ≤0.6).

The dielectric ceramic composition of the third embodiment of the present invention contains at least an oxide of Mn as the second component. In other words, the dielectric ceramic composition of the third embodiment of the present invention contains an oxide of Mn as an essential second component. When the dielectric ceramic composition of the third embodiment of the present invention contains an oxide of Mn as the second component, when it is used as a dielectric layer of a ceramic electronic component such as a laminated ceramic capacitor, as compared with the case where no oxide of Mn is contained, the change in electrostatic capacity is small even under a high-temperature condition of 150 to 200° C., the change rate of the electrostatic capacity rate falls within ±50% in the temperature range of −55° C. to 200° C., and the dielectric losses at 25° C. and 200° C. become small.

As for the content of an oxide of Mn as the second component, the content of an oxide of Mn in terms of MnO based on the mass of the compound existing in the region surrounded by line segments joining point A, point B, point C, point D, and point E on the ternary composition diagram shown in FIG. 1 (when the first component is a compound existing in the region surrounded by line segments joining point A', point B', point C', point D', point E', point F', point G', point H', point I', point J', point K', and point L' on the ternary composition diagram shown in FIG. 2, the content of the oxide of Mn in terms of MnO based on the mass of the compound existing in the region surrounded by line segments joining point A', point B', point C', point D', point E', point F', point G', point H', point I', point J', point K', and point L' on the ternary composition diagram shown in FIG. 2) is more than 0% by mass, and is preferably more than 0% by mass but not more than 3.5% by mass, more preferably 0.005 to 2.0% by mass, and further preferably 0.01 to 1.5% by mass. When the content of the oxide of Mn exceeds the above range, in some cases the dielectric loss tends to increase easily at high temperature, or the change of the electrostatic capacity tends to increase.

The dielectric ceramic composition of the third embodiment of the present invention contains as essential components an oxide of Mn as the second component, and may optionally contain further an oxide other than the oxide of Mn. The second component is added to a dielectric ceramic composition of the present invention in order to improve reduction resistance and other properties. The ratio of the total mass of the second component in terms of oxides based on the mass of the compound existing in the region surrounded by line segments joining point A, point B, point C, point D, and point E on the ternary composition diagram shown in FIG. 1 (when the first component is a compound existing in the region surrounded by line segments joining point A', point B', point C', point D', point E', point F', point G', point H', point r, point J', point K', and point L' on the ternary composition diagram shown in FIG. 2, the ratio of the total mass of the second component in terms of oxides based on the mass of the compound existing in the region surrounded by line segments joining point A', point B', point C', point D', point E', point F', point G', point H', point I', point J', point K', and point L' on the ternary composition diagram shown in FIG. 2) is preferably 10% by mass or less, and particularly preferably 0.1 to 5.50% by mass.

As the optional component of the second component contained in the dielectric ceramic composition of the third embodiment of the present invention, an oxide of D (D is at least one selected from Li, Mg, Si, Cr, Al, Fe, Co, Ni, Cu, Zn, Ga, Ge, In, W, Mo, Y, Hf, La, Ce, Pr, Nd, Sm, Eu, Gd, Tb, Dy, Ho, Er, Tm, Yb, and Lu) is preferable, and an oxide of Mg, an oxide of Si, and an oxide of Y are particularly preferable.

When the dielectric ceramic composition of the third embodiment of the present invention contains an oxide of Mn and an oxide of D as the second component, as for the total content of an oxide of Mn and an oxide of D, the ratio of the total mass of the oxide of Mn in terms of MnO and the oxide of D based on the mass of the compound existing in the region surrounded by line segments joining point A, point B, point C, point D, and point E on the ternary composition diagram shown in FIG. 1 (when the first component is a compound existing in the region surrounded by line segments joining point A', point B', point C', point D', point E', point F', point G', point H', point I', point J', point K', and point L' on the ternary composition diagram shown in FIG. 2, the ratio of the total mass of the oxide of Mn in terms of MnO and the oxide of D based on the mass of the compound existing in the region surrounded by line segments joining point A', point B', point C', point D', point E', point F', point G', point H', point I', point J', point K', and point L' on the ternary composition diagram shown in FIG. 2) is preferably 10% by mass or less, and particularly preferably 0.1 to 5.5% by mass. In this regard, the mass of the oxide of D is a value for Li in terms of $Li_2O$, for Mg in terms of MgO, for Si in terms of $SiO_2$, for Cr in terms of $Cr_2O_3$, for Al in terms of $Al_2O_3$, for Fe in terms of $Fe_2O_3$, for Co in terms of CoO, for Ni in terms of NiO, for Cu in terms of CuO, for Zn in terms of ZnO, for Ga in terms of $Ga_2O_3$, for Ge in terms of $GeO_2$, for In in terms of $In_2O_3$, for W in terms of $WO_3$, for Mo in terms of $MoO_3$, for Y in terms of $Y_2O_3$, for Hf in terms of $HfO_2$, for La in terms of $La_2O_3$, for Ce in terms of $CeO_2$, for Pr in terms of $Pr_6O_{11}$, for Nd in terms of $Nd_2O_3$, for Sm in terms of $Sm_2O_3$, for Eu in terms of $Eu_2O_3$, for Gd in terms of $Gd_2O_3$, for Tb in terms of $Tb_4O_7$, for Dy in terms of $Dy_2O_3$, for Ho in terms of $Ho_2O_3$, for Er in terms of $Er_2O_3$, for Tm in terms of $Tm_2O_3$, for Yb in terms of $Yb_2O_3$, and for Lu in terms of $Lu_2O_3$.

The dielectric ceramic composition of the third embodiment of the present invention shows the presence of a tungsten bronze-type crystal phase, when a crystal structure analysis such as X-ray diffraction is conducted, and the average grain size thereof is preferably 5 μm or less, and particularly preferably 3 μm or less.

The dielectric constants at 25° C. of the dielectric ceramic composition of the first embodiment of the present invention, the dielectric ceramic composition of the second embodiment of the present invention, and the dielectric ceramic composition of the third embodiment of the present invention should preferably be as high as possible, namely 100 or more, preferably 200 or more, and depending on the composition, 300 or more, or even 400 or more, or even 500 or more.

The change rates of the electrostatic capacity of the dielectric ceramic composition of the first embodiment of the present invention, the dielectric ceramic composition of the second embodiment of the present invention, and the dielectric ceramic composition of the third embodiment of the present invention are within ±50% in the temperature range of −55° C. to 200° C., and preferably within the range of −33% to 22%. In this regard, a change rate of electrostatic capacity in the present invention is a value obtained by a method described later.

The dielectric loss (tan δ) at 25° C. of the dielectric ceramic composition of the first embodiment of the present invention, the dielectric ceramic composition of the second embodiment of the present invention, and the dielectric ceramic composition of the third embodiment of the present invention are 10% or less, the dielectric loss (tan δ) at 200° C. are also 10% or less, and the high frequency characteristics are good.

The dielectric ceramic composition of the first embodiment of the present invention, the dielectric ceramic composition of the second embodiment of the present invention, and the dielectric ceramic composition of the third embodiment of the present invention may be fired under a reducing atmosphere.

(External Electrode 4)

An external electrode 4 is usually formed by applying a conductive paste for an external electrode to the end of the laminated body 10 after co-firing followed by firing, however the present invention is not limited thereto. An external electrode 4 may also be formed using a paste containing a thermosetting resin or a thermoplastic resin followed by a heat treatment. There is no particular restriction on a conductive component used for the conductive paste for the external electrode, and, for example, a pure metal, such as nickel, copper, silver, palladium, platinum and gold, as well as an alloy, a mixture, or a compound containing the metal component may be used. In addition, if necessary, glass frit may be added to the conductive paste. In addition, an external electrode 4 may be fired at the same time with a laminated body 10.

(Producing Method of Ceramic Capacitor 1)

A ceramic capacitor 1 is produced by a publicly known method except that the dielectric ceramic composition of the first embodiment of the present invention, the dielectric ceramic composition of the second embodiment of the present invention, or the dielectric ceramic composition of the third embodiment of the present invention is used. An example thereof will be described below.

First, a starting material for forming a dielectric layer 3 is prepared. Examples of the starting material include an oxide powder, such as CaO, SrO, BaO, $TiO_2$, $ZrO_2$, $SnO_2$, $Nb_2O_5$, $Ta_2O_5$, and $V_2O_5$, and a carbonate, a nitrate, or the like, which generates the oxide powder by firing.

These starting materials are weighed and mixed according to a target composition, and the resulting mixture is calcined in the air at a temperature of about 700 to 900° C. for about 3 to 6 hours. Next, the obtained product is finely pulverized, and the obtained dielectric raw materials are used as a raw material for the first component.

As a Mn source, a powder of a Mn compound, such as MnO and $MnCO_3$, and further a compound containing Li, Mg, Si, Cr, Al, Fe, Co, Ni, Cu, Zn, Ga, Ge, In, W. Mo, Y, Hf, La, Ce, Pr, Nd, Sm, Eu, Gd, Tb, Dy, Ho, Er, Tm, Yb, Lu or the like, which may be added if necessary, is provided as a raw material for the second component.

Next, the raw material for the first component and the raw material for the second component are kneaded and dispersed in an appropriate binder component to prepare a dielectric paste or a dielectric slurry. The dielectric paste or the dielectric slurry may, if necessary, contain an additive such as a plasticizer.

Next, the obtained dielectric paste or dielectric slurry is formed into a sheet, and then a conductor pattern is formed on a surface of the obtained green sheet with the above-mentioned conductive paste for internal electrode. This is repeated a predetermined number of times to stack the sheets, which are pressed to be consolidated to yield an unfired laminate body (hereinafter referred to as a green chip).

Next, debinding is performed on the green chip, if necessary. There is no particular restriction on debinding conditions. For example, a heat treatment at a holding temperature of 180 to 400° C. for 1 to 3 hours may be conducted.

Next, the green chip is fired in a reducing atmosphere at about 1150 to 1350° C. to yield a fired laminated body 10 (hereinafter referred to as sintered compact 10).

Thereafter, if necessary, a reoxidation treatment (hereinafter referred to as annealing) is performed on the sintered compact 10. The annealing condition may be a known condition widely used in the art, but it is for example preferable that the oxygen partial pressure at the time of annealing is higher than the oxygen partial pressure at the time of firing, and the holding temperature is set at 1100° C. or lower.

End face polishing is performed on the sintered compact 10 obtained as described above, and a conductive paste for external electrode is applied thereto and fired to form an external electrode 4, and the plated layer described above is formed, if necessary, on a surface of the external electrode 4.

The ceramic capacitor 1 thus obtained is implemented on a printed circuit board or the like with soldering or the like and used for various electronic equipment, etc.

Although the embodiments of the present invention have been described above, the present invention is not limited in any way to the above embodiments, and it may be variously applied without departing from the scope and spirit of the present invention.

Although the ceramic capacitor has been described above as an example, it can be utilized similarly in other ceramic electronic components, such as an inductor and an actuator.

The present invention will be described below by way of specific experimental examples; however, the present invention is not limited thereto. Note that the composition of a dielectric ceramic composition described below has been estimated based on the raw material composition (feed composition), or the crystal structure analysis, which is also true herein.

EXAMPLES

Example 1 and Comparative Example 1

(1) Preparation of Samples 1 to 90 of Dielectric Ceramic Composition

As the starting materials for the first component, the respective powders of $CaCO_3$, $SrCO_3$, $BaCO_3$, $TiO_2$, $ZrO_2$, SnO, $Nb_2O_5$, $Ta_2O_5$, and $V_2O_5$ were weighed in the ratios set forth in Table 1, Table 3, and Table 5 in terms of oxides, and wet-blended using pure water with a ball mill for 20 hours.

Next, each of the blends thus obtained was dried at 100° C., thereafter calcined at 750 to 900° C. for 3 hours in air, and finely pulverized again in the same manner with a ball mill to yield a dielectric raw material for the first component.

For the second component, 18.2 mg of $MnCO_3$, 32 mg of MgO, 58.6 mg of $SiO_2$, and 89.5 mg of $Y_2O_3$ were weighed respectively, and a mixture thereof was provided as a raw material for the second component. However, in Sample 43, only three components of $MnCO_3$, MgO, and $Y_2O_3$ excluding $SiO_2$ were used as the raw material for the second component. In Sample 44, only three components of $MnCO_3$, $SiO_2$ and $Y_2O_3$ excluding MgO were used as the raw material for the second component. In Sample 45, only three components of $MnCO_3$, MgO, and $SiO_2$ excluding $Y_2O_3$ were used. In Samples 78 and 79, only three components of MgO, $SiO_2$ and $Y_2O_3$ excluding $MnCO_3$ were used. In Sample 41, the amount of $MnCO_3$ in the raw material for the second component was changed to 0.404 mg, in Sample 42 the amount of $MnCO_3$ was changed to 0.198 g, and in Sample 80 the amount of $MnCO_3$ was changed to 2.055 g.

Ion exchanged water and poly(vinyl alcohol) were charged into a container such that the concentration of poly(vinyl alcohol) became 6% by mass, and mixed at 90° C. for 1 hour to prepare an aqueous solution of poly(vinyl alcohol).

Then, 25 g of each of the dielectric raw materials for the first component and the raw material for the second component in the aforedescribed amount were mixed, and the aqueous solution of poly(vinyl alcohol) was added to the raw material mixture such that the concentration of the poly(vinyl alcohol) became 10° % by mass relative to the raw material mixture, which was mixed in a mortar and then granulated to form granules.

Then, the obtained granules were charged into a mold with a diameter of 14.0 mm and press-molded at a pressure of 1 ton/cm$^2$ to obtain a disk-shaped green compact.

Then, the obtained green compact was fired in a reducing atmosphere to prepare a sintered compact. At this time, the firing was carried out at a rate of temperature increase of 300° C./hr, a holding temperature of 1150 to 1300° C., and for a holding time of 2 hours. The atmospheric gas was a moistened hydrogen/nitrogen mixed gas (hydrogen concentration 0.5%), and for moistening a wetter was used (wetter temperature 35° C.).

Next, In—Ga electrodes having a diameter of 8 mm were attached to the two main surfaces of the sintered compact with respect to the obtained sintered compact, to obtain a disk-shaped ceramic capacitor corresponding to each of Samples 1 to 90.

(2) Analyses of Samples 1 to 90 of Dielectric Ceramic Compositions

The grain size, the crystal phase, the dielectric constant, the change rate of the electrostatic capacity, and the dielectric loss (tan δ) of the disk-shaped ceramic capacitor corresponding to each of Samples 1 to 90 obtained as described above were respectively analyzed by the following methods. The results are shown in Tables 2, 4, and 6.

<Grain Size>

Figure 3:
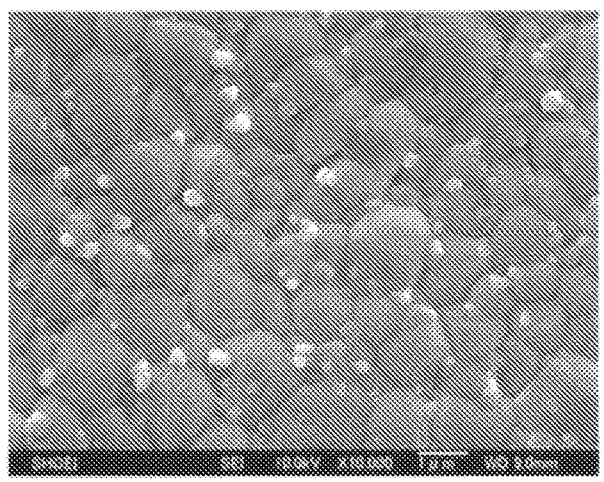
FIG. 3 is an SEM image (10,000×) of Sample 8.
Figure 4:
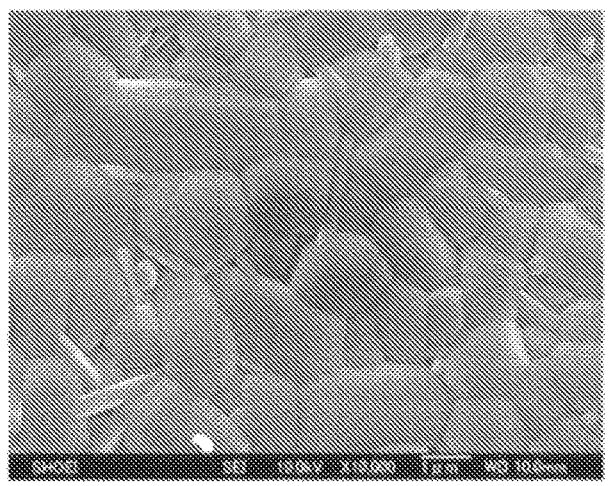
FIG. 4 is an SEM image (10,000×) of Sample 15.
Figure 5:
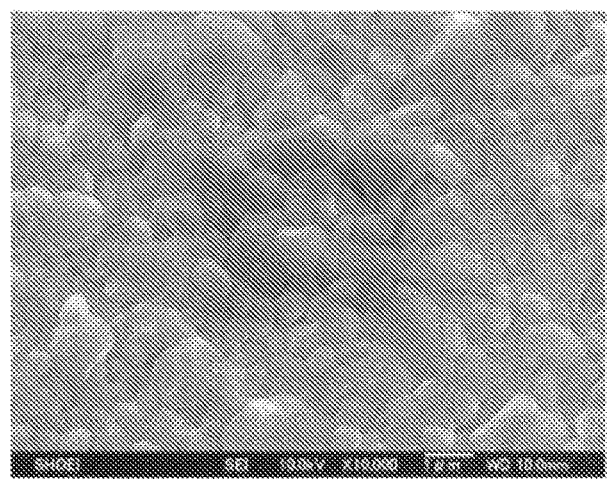
FIG. 5 is an SEM image (10,000×) of Sample 66.

The surface of each capacitor was observed with a scanning electron microscope (SEM), and the average value of the equivalent circle diameters determined based on grain boundaries of a randomly selected 20 crystal grains was regarded as the grain size. FIGS. 3, 4, and 5 are respectively SEM images of Samples 8, 15, and 66.

<Crystal Phase>

Figure 9:
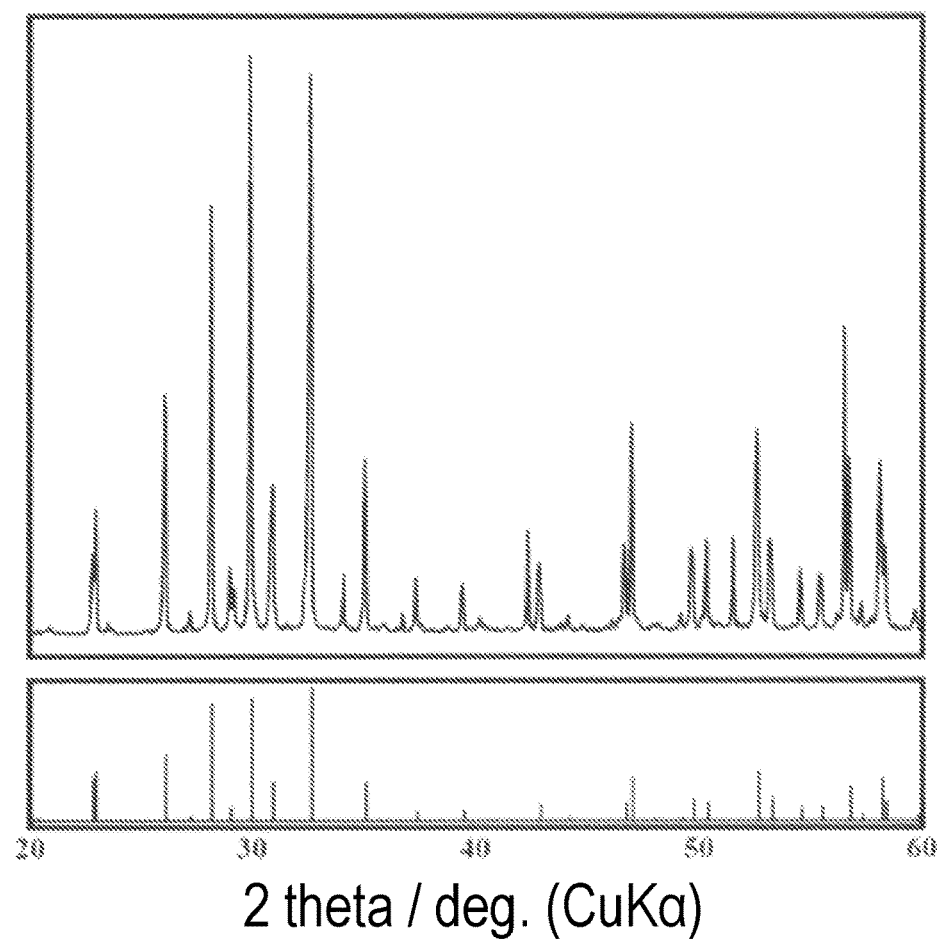
FIG. 9 shows the results of an X-ray diffraction measurement of Sample 15.

The crystal phase was identified by an X-ray diffraction measurement. As a representative example, the result of an X-ray diffraction measurement of Sample 15 is shown in FIG. 9. The lower chart in the figure was relevant to the reference tungsten bronze-type crystal phase, and it was confirmed that Sample 15 included a tungsten bronze-type crystal phase. The X-ray diffraction measurement results including those of other Samples are shown in Tables 2, 4, and 6. The symbol "T" in the table indicates that the presence of the tungsten bronze-type crystal phase was confirmed.

<Dielectric Constant>

With respect to each capacitor, the electrostatic capacity C at a reference temperature of 25° C. was measured using an LCR meter (4284A, manufactured by Agilent Technologies, Inc.) at a frequency of 1 kHz, and a measurement voltage of 1 $V_{rms}$. Then, a dielectric constant was calculated based on the thickness of the sintered compact, the effective electrode area, and the electrostatic capacity C obtained as a result of the measurement. Also, at the reference temperature of 200° C., a dielectric constant was calculated in the same manner.

In this regard, a higher dielectric constant is preferable, and it was considered that a dielectric constant higher than 100 at 25° C. was satisfactory.

<Change Rate of Electrostatic Capacity>

The electrostatic capacity $C_t$ at each temperature t in a temperature range from −55° C. to 200° C. was measured under the same conditions as for the measurement of the dielectric constant (4284A manufactured by Agilent Technologies, Inc., frequency 1 kHz, and measurement voltage 1 $V_{rms}$). Then, based on the reference electrostatic capacity at 25° C. ($C_{25}$), a change rate of the electrostatic capacity was calculated by the equation: a change rate of the electrostatic capacity=(($C_t$−$C_{25}$)/$C_{25}$)×100(%) (hereinafter the change rate of the electrostatic capacity may be denoted as $\Delta C_t/C_{25}$).

In this regard, a change rate of the electrostatic capacity closer to 0 is preferable, and it was considered that a change rate of the electrostatic capacity within ±50% was satisfactory.

Figure 6:
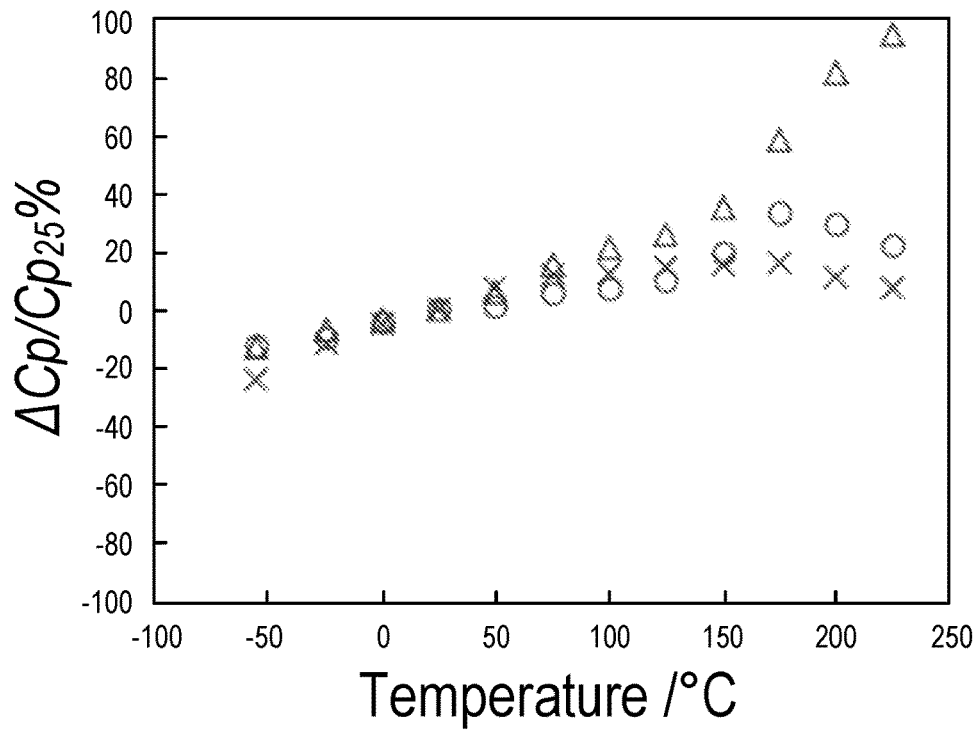
FIG. 6 is a graph showing trends of the change rates of the electrostatic capacity of Samples 8, 15, and 66.
Figure 7:
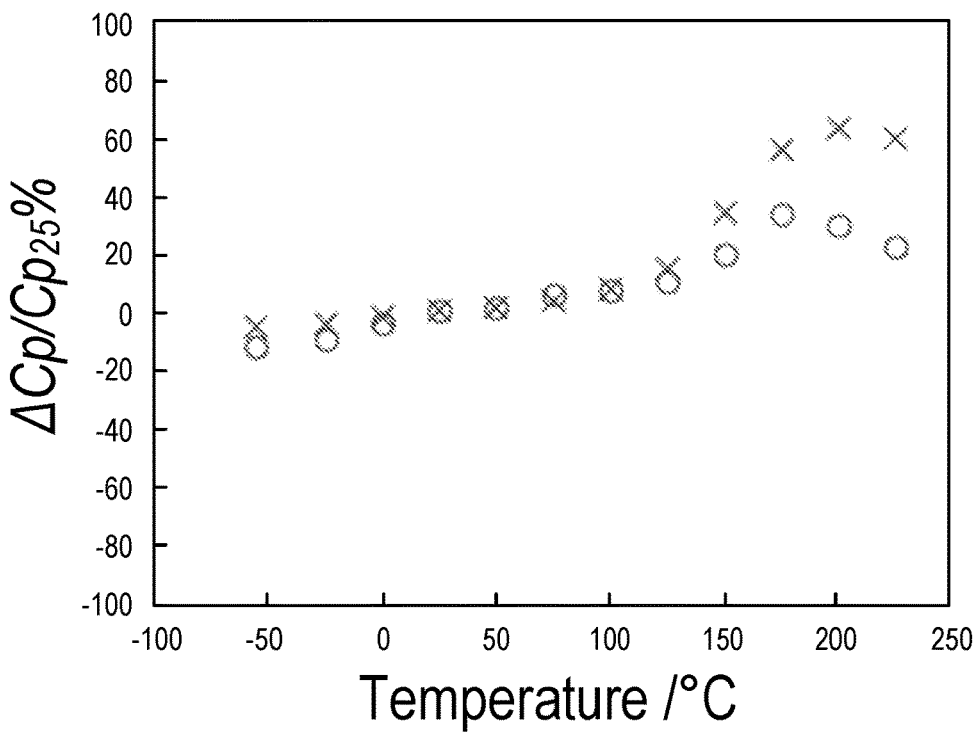
FIG. 7 is a graph showing trends of the change rates of the electrostatic capacity of Samples 15, and 78.

The trends of the change rate of the electrostatic capacity from −55° C. to 200° C. of Samples 8, 15, and 66 are shown in FIG. 6. In this regard, the cross (X) symbol in the figure indicates the change rate of the electrostatic capacity of Sample 8, the circle symbol indicates that of Sample 15, and the triangle symbol indicates that of Sample 66. Further, the trends of the change rate of the electrostatic capacity from −55° C. to 200° C. of Samples 15 and 78 are shown in FIG. 7. In the figure, the circle symbol indicates the change rate of the electrostatic capacity of Sample 15 and the cross (X) symbol indicates that of Sample 78.

<Dielectric Loss (Tan δ)>

With respect to each capacitor sample, the tan δ was measured using an LCR meter (4284A, manufactured by Agilent Technologies, Inc.) at a frequency of 1 kHz, and a measurement voltage of 1 $V_{rms}$. When a tan δ was 10% or less at both 25° C. and 200° C., it was considered satisfactory.

TABLE 1

| Sample number | Main component Composition in terms of oxide [mol %] | | | | | | | | | Dielectric ceramic composition | Sub-components Composition in terms of oxide [mass %] | | Total content of sub-components |
|---|---|---|---|---|---|---|---|---|---|---|---|---|---|
| | CaO | SrO | BaO | TiO$_2$ | ZrO$_2$ | SnO$_2$ | Nb$_2$O$_5$ | Ta$_2$O$_5$ | V$_2$O$_5$ | | Type of oxide component | MnO content | |
| Sample 1 | 33.3 | 0.0 | 16.7 | 16.7 | 0.0 | 0.0 | 33.3 | 0.0 | 0.0 | Ca$_4$Ba$_2$Ti$_2$Nb$_3$O$_{30}$ | Mg, Mn, Si, Y | 0.0448 | 0.765 |
| Sample 2 | 25.0 | 0.0 | 25.0 | 16.7 | 0.0 | 0.0 | 33.3 | 0.0 | 0.0 | Ca$_3$Ba$_3$Ti$_2$Nb$_3$O$_{30}$ | Mg, Mn, Si, Y | 0.0448 | 0.765 |
| Sample 3 | 16.7 | 0.0 | 33.3 | 16.7 | 0.0 | 0.0 | 33.3 | 0.0 | 0.0 | Ca$_2$Ba$_4$Ti$_2$Nb$_3$O$_{30}$ | Mg, Mn, Si, Y | 0.0448 | 0.765 |
| Sample 4 | 4.2 | 0.0 | 45.8 | 16.7 | 0.0 | 0.0 | 33.3 | 0.0 | 0.0 | Ca$_{0.5}$Ba$_{5.5}$Ti$_2$Nb$_8$O$_{30}$ | Mg, Mn, Si, Y | 0.0448 | 0.765 |
| Sample 5 | 0.0 | 0.0 | 50.0 | 16.7 | 0.0 | 0.0 | 33.3 | 0.0 | 0.0 | Ba$_6$Ti$_2$Nb$_8$O$_{30}$ | Mg, Mn, Si, Y | 0.0448 | 0.765 |
| Sample 6 | 16.7 | 8.3 | 25.0 | 16.7 | 0.0 | 0.0 | 33.3 | 0.0 | 0.0 | Ca$_2$SrBa$_3$Ti$_2$Nb$_8$O$_{30}$ | Mg, Mn, Si, Y | 0.0448 | 0.765 |
| Sample 7 | 0.0 | 8.3 | 41.7 | 16.7 | 0.0 | 0.0 | 33.3 | 0.0 | 0.0 | SrBa$_5$Ti$_2$Nb$_8$O$_{30}$ | Mg, Mn, Si, Y | 0.0448 | 0.765 |
| Sample 8 | 16.7 | 16.7 | 16.7 | 16.7 | 0.0 | 0.0 | 33.3 | 0.0 | 0.0 | Ca$_2$Sr$_2$Ba$_2$Ti$_2$Nb$_8$O$_{30}$ | Mg, Mn, Si, Y | 0.0448 | 0.765 |
| Sample 9 | 7.3 | 21.3 | 21.3 | 16.7 | 0.0 | 0.0 | 33.3 | 0.0 | 0.0 | Ca$_{0.8}$Sr$_{2.6}$Ba$_{2.6}$Ti$_2$Nb$_8$O$_{30}$ | Mg, Mn, Si, Y | 0.0448 | 0.765 |

TABLE 1-continued

| Sample number | Main component Composition in terms of oxide [mol %] | | | | | | | | | Dielectric ceramic composition | Sub-components Composition in terms of oxide [mass %] | | |
|---|---|---|---|---|---|---|---|---|---|---|---|---|---|
| | CaO | SrO | BaO | $TiO_2$ | $ZrO_2$ | $SnO_2$ | $Nb_2O_5$ | $Ta_2O_5$ | $V_2O_5$ | | Type of oxide component | MnO content | Total content of sub-components |
| Sample 10 | 0.0 | 25.0 | 25.0 | 16.7 | 0.0 | 0.0 | 33.3 | 0.0 | 0.0 | $Sr_3Ba_3Ti_2Nb_8O_{30}$ | Mg, Mn, Si, Y | 0.0448 | 0.765 |
| Sample 11 | 33.3 | 16.7 | 0.0 | 16.7 | 0.0 | 0.0 | 33.3 | 0.0 | 0.0 | $Ca_4Sr_2Ti_2Nb_8O_{30}$ | Mg, Mn, Si, Y | 0.0448 | 0.765 |
| Sample 12 | 8.3 | 33.3 | 8.3 | 16.7 | 0.0 | 0.0 | 33.3 | 0.0 | 0.0 | $CaSr_4BaTi_2Nb_8O_{30}$ | Mg, Mn, Si, Y | 0.0448 | 0.765 |
| Sample 13 | 0.0 | 37.5 | 12.5 | 16.7 | 0.0 | 0.0 | 33.3 | 0.0 | 0.0 | $Sr_{4.5}Ba_{1.5}Ti_2Nb_8O_{30}$ | Mg, Mn, Si, Y | 0.0448 | 0.765 |
| Sample 14 | 8.3 | 41.7 | 0.0 | 16.7 | 0.0 | 0.0 | 33.3 | 0.0 | 0.0 | $CaSr_5Ti_2Nb_8O_{30}$ | Mg, Mn, Si, Y | 0.0448 | 0.765 |
| Sample 15 | 16.7 | 33.3 | 0.0 | 16.7 | 0.0 | 0.0 | 33.3 | 0.0 | 0.0 | $Ca_2Sr_4Ti_2Nb_8O_{30}$ | Mg, Mn, Si, Y | 0.0448 | 0.765 |
| Sample 16 | 16.7 | 33.3 | 0.0 | 16.7 | 0.0 | 0.0 | 32.5 | 0.8 | 0.0 | $Ca_2Sr_4Ti_2Nb_{7.8}Ta_{0.2}O_{30}$ | Mg, Mn, Si, Y | 0.0448 | 0.765 |
| Sample 17 | 16.7 | 33.3 | 0.0 | 16.7 | 0.0 | 0.0 | 26.6 | 6.7 | 0.0 | $Ca_2Sr_4Ti_2Nb_{6.4}Ta_{1.6}O_{30}$ | Mg, Mn, Si, Y | 0.0448 | 0.765 |
| Sample 18 | 16.7 | 33.3 | 0.0 | 16.7 | 0.0 | 0.0 | 20.0 | 13.3 | 0.0 | $Ca_2Sr_4Ti_2Nb_{4.8}Ta_{3.2}O_{30}$ | Mg, Mn, Si, Y | 0.0448 | 0.765 |
| Sample 19 | 16.7 | 33.3 | 0.0 | 16.7 | 0.0 | 0.0 | 13.3 | 20.0 | 0.0 | $Ca_2Sr_4Ti_2Nb_{3.2}Ta_{4.8}O_{30}$ | Mg, Mn, Si, Y | 0.0448 | 0.765 |
| Sample 20 | 16.7 | 33.3 | 0.0 | 16.7 | 0.0 | 0.0 | 6.7 | 26.7 | 0.0 | $Ca_2Sr_4Ti_2Nb_{1.6}Ta_{6.4}O_{30}$ | Mg, Mn, Si, Y | 0.0448 | 0.765 |
| Sample 21 | 16.7 | 33.3 | 0.0 | 16.7 | 0.0 | 0.0 | 0.0 | 33.3 | 0.0 | $Ca_2Sr_4Ti_2Ta_6O_{30}$ | Mg, Mn, Si, Y | 0.0448 | 0.765 |
| Sample 22 | 16.7 | 33.3 | 0.0 | 15.0 | 1.7 | 0.0 | 33.3 | 0.0 | 0.0 | $Ca_2Sr_4Ti_{1.8}Zr_{0.2}Nb_8O_{30}$ | Mg, Mn, Si, Y | 0.0448 | 0.765 |
| Sample 23 | 16.7 | 33.3 | 0.0 | 13.3 | 3.3 | 0.0 | 33.3 | 0.0 | 0.0 | $Ca_2Sr_4Ti_{1.6}Zr_{0.4}Nb_8O_{30}$ | Mg, Mn, Si, Y | 0.0448 | 0.765 |
| Sample 24 | 16.7 | 33.3 | 0.0 | 11.7 | 5.0 | 0.0 | 33.3 | 0.0 | 0.0 | $Ca_2Sr_4Ti_{1.4}Zr_{0.6}Nb_8O_{30}$ | Mg, Mn, Si, Y | 0.0448 | 0.765 |
| Sample 25 | 16.7 | 33.3 | 0.0 | 10.0 | 6.7 | 0.0 | 33.3 | 0.0 | 0.0 | $Ca_2Sr_4Ti_{1.2}Zr_{0.8}Nb_8O_{30}$ | Mg, Mn, Si, Y | 0.0448 | 0.765 |
| Sample 26 | 16.7 | 33.3 | 0.0 | 6.7 | 10.0 | 0.0 | 33.3 | 0.0 | 0.0 | $Ca_2Sr_4Ti_{0.8}Zr_{1.2}Nb_8O_{30}$ | Mg, Mn, Si, Y | 0.0448 | 0.765 |
| Sample 27 | 16.7 | 33.3 | 0.0 | 3.3 | 13.3 | 0.0 | 33.3 | 0.0 | 0.0 | $Ca_2Sr_4Ti_{0.4}Zr_{1.6}Nb_8O_{30}$ | Mg, Mn, Si, Y | 0.0448 | 0.765 |
| Sample 28 | 16.7 | 33.3 | 0.0 | 0.0 | 16.7 | 0.0 | 33.3 | 0.0 | 0.0 | $Ca_2Sr_4Zr_2Nb_8O_{30}$ | Mg, Mn, Si, Y | 0.0448 | 0.765 |
| Sample 29 | 16.7 | 33.3 | 0.0 | 16.5 | 0.0 | 0.2 | 33.3 | 0.0 | 0.0 | $Ca_2Sr_4Ti_{1.98}Sn_{0.02}Nb_8O_{30}$ | Mg, Mn, Si, Y | 0.0448 | 0.765 |
| Sample 30 | 16.7 | 33.3 | 0.0 | 16.7 | 0.0 | 0.0 | 33.0 | 0.0 | 0.3 | $Ca_2Sr_4Ti_2Nb_{7.96}V_{0.04}O_{30}$ | Mg, Mn, Si, Y | 0.0448 | 0.765 |

TABLE 2

| Sample number | Crystal phase | Grain size [μm] | Dielectric constant | | Change rate of electrostatic capacity [%] | | tanδ [%] | |
|---|---|---|---|---|---|---|---|---|
| | | | 25° C. | 200° C. | −55° C. | 200° C. | 25° C. | 200° C. |
| Sample 1 | T | 1.4 | 101.1 | 104.2 | −17.2 | 3.1 | 3.9 | 7.4 |
| Sample 2 | T | 0.8 | 214.2 | 252.1 | −15.8 | 17.7 | 3.2 | 6.8 |
| Sample 3 | T | 1.1 | 157.7 | 135.4 | −15.4 | −14.2 | 4.7 | 7.2 |
| Sample 4 | T | 0.9 | 116.8 | 134.6 | −9.6 | 15.2 | 3.7 | 7.8 |
| Sample 5 | T | 0.9 | 992.6 | 637.6 | −29.3 | 35.8 | 1.8 | 8.5 |
| Sample 6 | T | 1.9 | 464.4 | 652.5 | −30.0 | 40.5 | 2.6 | 4.5 |
| Sample 7 | T | 1.8 | 249.4 | 202.2 | 9.8 | −18.9 | 1.4 | 2.4 |
| Sample 8 | T | 1.4 | 743.5 | 825.8 | −23.9 | 11.1 | 2.2 | 8.8 |
| Sample 9 | T | 0.8 | 146.0 | 153.5 | 7.9 | 5.2 | 1.7 | 3.7 |
| Sample 10 | T | 0.9 | 141.4 | 131.0 | −5.0 | −7.4 | 5.6 | 8.5 |
| Sample 11 | T | 0.8 | 116.3 | 112.5 | 2.3 | 16.0 | 3.3 | 6.8 |
| Sample 12 | T | 1.9 | 567.9 | 591.3 | −17.0 | 4.1 | 2.3 | 4.0 |
| Sample 13 | T | 0.9 | 242.0 | 270.9 | −30.8 | 21.8 | 2.4 | 8.6 |
| Sample 14 | T | 2.0 | 464.8 | 567.6 | −8.6 | 22.1 | 2.8 | 8.1 |
| Sample 15 | T | 1.7 | 816.0 | 1051.4 | −12.3 | 28.9 | 3.0 | 0.8 |
| Sample 16 | T | 2.5 | 437.6 | 525.3 | −15.7 | 20.0 | 2.7 | 6.7 |
| Sample 17 | T | 1.8 | 875.3 | 674.3 | −16.4 | −23.0 | 0.9 | 1.1 |
| Sample 18 | T | 1.0 | 663.1 | 474.4 | −7.4 | −28.4 | 1.8 | 1.4 |
| Sample 19 | T | 1.1 | 413.8 | 270.3 | 25.6 | −34.7 | 0.2 | 1.6 |
| Sample 20 | T | 1.4 | 315.8 | 229.2 | 34.5 | −27.4 | 0.1 | 0.7 |
| Sample 21 | T | 1.1 | 241.1 | 191.6 | 22.8 | −20.5 | 0.3 | 0.9 |
| Sample 22 | T | 2.9 | 495.6 | 607.4 | −17.7 | 22.6 | 3.2 | 6.0 |
| Sample 23 | T | 2.6 | 508.1 | 489.2 | −17.5 | −3.7 | 3.2 | 5.4 |
| Sample 24 | T | 2.1 | 982.0 | 853.0 | −23.1 | −13.1 | 3.0 | 3.9 |
| Sample 25 | T | 2.7 | 873.8 | 732.4 | −16.6 | −16.2 | 2.4 | 3.8 |
| Sample 26 | T | 1.2 | 411.5 | 326.6 | 2.6 | −20.6 | 1.1 | 2.8 |
| Sample 27 | T | 1.6 | 832.5 | 691.9 | −7.9 | −16.9 | 0.9 | 3.5 |
| Sample 28 | T | 1.2 | 320.9 | 247.3 | 1.9 | −22.9 | 8.1 | 2.2 |
| Sample 29 | T | 1.8 | 845.7 | 1138.7 | −23.9 | 34.6 | 3.2 | 2.8 |
| Sample 30 | T | 2.0 | 882.3 | 1192.6 | −38.1 | 35.2 | 3.3 | 3.4 |

TABLE 3

| Sample number | Composition in terms of oxide [mol %] | | | | | | | | | Dielectric ceramic composition |
|---|---|---|---|---|---|---|---|---|---|---|
| | CaO | SrO | BaO | TiO$_2$ | ZrO$_2$ | SnO$_2$ | Nb$_2$O$_5$ | Ta$_2$O$_5$ | V$_2$O$_5$ | |
| Sample 31 | 16.7 | 33.3 | 0.0 | 16.5 | 0.0 | 0.2 | 33.0 | 0.0 | 0.3 | Ca$_2$Sr$_4$Ti$_{1.98}$Sn$_{0.02}$Nb$_{7.96}$V$_{0.04}$O$_{30}$ |
| Sample 32 | 16.5 | 33.0 | 0.0 | 16.8 | 0.0 | 0.0 | 33.7 | 0.0 | 0.0 | Ca$_{1.96}$Sr$_{3.92}$Ti$_2$Nb$_8$O$_{30}$ |
| Sample 33 | 16.6 | 33.2 | 0.0 | 16.8 | 0.0 | 0.0 | 33.5 | 0.0 | 0.0 | Ca$_{1.98}$Sr$_{3.96}$Ti$_2$Nb$_8$O$_{30}$ |
| Sample 34 | 16.6 | 33.2 | 0.0 | 16.7 | 0.0 | 0.0 | 33.4 | 0.0 | 0.0 | Ca$_{1.99}$Sr$_{3.98}$Ti$_2$Nb$_8$O$_{30}$ |
| Sample 35 | 16.7 | 33.4 | 0.0 | 16.6 | 0.0 | 0.0 | 33.3 | 0.0 | 0.0 | Ca$_{2.01}$Sr$_{4.02}$Ti$_2$Nb$_8$O$_{30}$ |
| Sample 36 | 16.7 | 33.5 | 0.0 | 16.6 | 0.0 | 0.0 | 33.2 | 0.0 | 0.0 | Ca$_{2.02}$Sr$_{4.04}$Ti$_2$Nb$_8$O$_{30}$ |
| Sample 37 | 16.7 | 25.0 | 8.3 | 16.7 | 0.0 | 0.0 | 33.3 | 0.0 | 0.0 | Ca$_2$Sr$_3$BaTi$_2$Nb$_8$O$_{30}$ |
| Sample 38 | 16.7 | 16.7 | 16.7 | 16.7 | 0.0 | 0.0 | 31.7 | 1.7 | 0.0 | Ca$_2$Sr$_2$Ba$_2$Ti$_2$Nb$_{7.6}$Ta$_{0.4}$O$_{30}$ |
| Sample 39 | 0.0 | 16.7 | 33.3 | 16.7 | 0.0 | 0.0 | 25.0 | 8.3 | 0.0 | Ca$_2$Ba$_4$Ti$_2$Nb$_6$Ta$_2$O$_{30}$ |
| Sample 40 | 7.3 | 21.3 | 21.3 | 16.7 | 0.0 | 0.0 | 25.0 | 8.3 | 0.0 | Ca$_{0.8}$Sr$_{2.6}$Ba$_{2.6}$Ti$_2$Nb$_6$Ta$_2$O$_{30}$ |
| Sample 41 | 16.7 | 33.3 | 0.0 | 16.7 | 0.0 | 0.0 | 33.3 | 0.0 | 0.0 | Ca$_2$Sr$_4$Ti$_2$Nb$_8$O$_{30}$ |
| Sample 42 | 16.7 | 33.3 | 0.0 | 16.7 | 0.0 | 0.0 | 33.3 | 0.0 | 0.0 | Ca$_2$Sr$_4$Ti$_2$Nb$_8$O$_{30}$ |
| Sample 43 | 16.7 | 33.3 | 0.0 | 16.7 | 0.0 | 0.0 | 33.3 | 0.0 | 0.0 | Ca$_2$Sr$_4$Ti$_2$Nb$_8$O$_{30}$ |
| Sample 44 | 16.7 | 33.3 | 0.0 | 16.7 | 0.0 | 0.0 | 33.3 | 0.0 | 0.0 | Ca$_2$Sr$_4$Ti$_2$Nb$_8$O$_{30}$ |
| Sample 45 | 16.7 | 33.3 | 0.0 | 16.7 | 0.0 | 0.0 | 33.3 | 0.0 | 0.0 | Ca$_2$Sr$_4$Ti$_2$Nb$_8$O$_{30}$ |
| Sample 46 | 33.3 | 8.3 | 8.3 | 16.7 | 0.0 | 0.0 | 33.3 | 0.0 | 0.0 | Ca$_4$SrBaTi$_2$Nb$_8$O$_{30}$ |
| Sample 47 | 0.0 | 42.5 | 7.5 | 16.7 | 0.0 | 0.0 | 33.3 | 0.0 | 0.0 | Sr$_{5.1}$Ba$_{0.9}$Ti$_2$Nb$_8$O$_{30}$ |
| Sample 48 | 5.0 | 45.0 | 0.0 | 16.7 | 0.0 | 0.0 | 33.3 | 0.0 | 0.0 | Ca$_{0.6}$Sr$_{5.4}$Ti$_2$Nb$_8$O$_{30}$ |
| Sample 49 | 21.7 | 0.0 | 28.3 | 16.7 | 0.0 | 0.0 | 33.3 | 0.0 | 0.0 | Ca$_{2.6}$Ba$_{3.4}$Ti$_2$Nb$_8$O$_{30}$ |
| Sample 50 | 27.5 | 2.5 | 20.0 | 16.7 | 0.0 | 0.0 | 33.3 | 0.0 | 0.0 | Ca$_{3.3}$Sr$_{0.3}$Ba$_{2.4}$Ti$_2$Nb$_8$O$_{30}$ |
| Sample 51 | 30.0 | 7.5 | 12.5 | 16.7 | 0.0 | 0.0 | 33.3 | 0.0 | 0.0 | Ca$_{3.6}$Sr$_{0.9}$Ba$_{1.5}$Ti$_2$Nb$_8$O$_{30}$ |
| Sample 52 | 30.0 | 12.5 | 7.5 | 16.7 | 0.0 | 0.0 | 33.3 | 0.0 | 0.0 | Ca$_{3.6}$Sr$_{1.5}$Ba$_{0.9}$Ti$_2$Nb$_8$O$_{30}$ |
| Sample 53 | 27.5 | 20.0 | 2.5 | 16.7 | 0.0 | 0.0 | 33.3 | 0.0 | 0.0 | Ca$_{3.3}$Sr$_{2.4}$Ba$_{0.3}$Ti$_2$Nb$_8$O$_{30}$ |
| Sample 54 | 25.0 | 25.0 | 0.0 | 16.7 | 0.0 | 0.0 | 33.3 | 0.0 | 0.0 | Ca$_3$Sr$_3$Ti$_2$Nb$_8$O$_{30}$ |
| Sample 55 | 2.5 | 45.0 | 2.5 | 16.7 | 0.0 | 0.0 | 33.3 | 0.0 | 0.0 | Ca$_{0.3}$Sr$_{5.4}$Ba$_{0.3}$Ti$_2$Nb$_8$O$_{30}$ |
| Sample 56 | 3.3 | 33.3 | 13.3 | 16.7 | 0.0 | 0.0 | 33.3 | 0.0 | 0.0 | Ca$_{0.4}$Sr$_4$Ba$_{1.6}$Ti$_2$Nb$_8$O$_{30}$ |
| Sample 57 | 10.0 | 22.5 | 17.5 | 16.7 | 0.0 | 0.0 | 33.3 | 0.0 | 0.0 | Ca$_{1.2}$Sr$_{2.7}$Ba$_{2.1}$Ti$_2$Nb$_8$O$_{30}$ |
| Sample 58 | 13.3 | 18.3 | 18.3 | 16.7 | 0.0 | 0.0 | 33.3 | 0.0 | 0.0 | Ca$_{1.6}$Sr$_{2.2}$Ba$_{2.2}$Ti$_2$Nb$_8$O$_{30}$ |
| Sample 59 | 10.0 | 17.5 | 22.5 | 16.7 | 0.0 | 0.0 | 33.3 | 0.0 | 0.0 | Ca$_{1.2}$Sr$_{2.1}$Ba$_{2.7}$Ti$_2$Nb$_8$O$_{30}$ |
| Sample 60 | 3.3 | 18.3 | 28.3 | 16.7 | 0.0 | 0.0 | 33.3 | 0.0 | 0.0 | Ca$_{0.4}$Sr$_{2.2}$Ba$_{3.4}$Ti$_2$Nb$_8$O$_{30}$ |

| Sample number | Sub-components Composition in terms of oxide [mass %] | | |
|---|---|---|---|
| | Type of oxide component | MnO content | Total content of sub-components |
| Sample 31 | Mg, Mn, Si, Y | 0.0448 | 0.765 |
| Sample 32 | Mg, Mn, Si, Y | 0.0448 | 0.765 |
| Sample 33 | Mg, Mn, Si, Y | 0.0448 | 0.765 |
| Sample 34 | Mg, Mn, Si, Y | 0.0448 | 0.765 |
| Sample 35 | Mg, Mn, Si, Y | 0.0448 | 0.765 |
| Sample 36 | Mg, Mn, Si, Y | 0.0448 | 0.765 |
| Sample 37 | Mg, Mn, Si, Y | 0.0448 | 0.765 |
| Sample 38 | Mg, Mn, Si, Y | 0.0448 | 0.765 |
| Sample 39 | Mg, Mn, Si, Y | 0.0448 | 0.765 |
| Sample 40 | Mg, Mn, Si, Y | 0.0448 | 0.765 |
| Sample 41 | Mg, Mn, Si, Y | 0.0010 | 0.721 |
| Sample 42 | Mg, Mn, Si, Y | 0.4873 | 1.213 |
| Sample 43 | Mg, Mn, Y | 0.0448 | 0.531 |
| Sample 44 | Mn, Si, Y | 0.0448 | 0.637 |
| Sample 45 | Mg, Mn, Si | 0.0448 | 0.407 |
| Sample 46 | Mg, Mn, Si, Y | 0.0448 | 0.765 |
| Sample 47 | Mg, Mn, Si, Y | 0.0448 | 0.765 |
| Sample 48 | Mg, Mn, Si, Y | 0.0448 | 0.765 |
| Sample 49 | Mg, Mn, Si, Y | 0.0448 | 0.765 |
| Sample 50 | Mg, Mn, Si, Y | 0.0448 | 0.765 |
| Sample 51 | Mg, Mn, Si, Y | 0.0448 | 0.765 |
| Sample 52 | Mg, Mn, Si, Y | 0.0448 | 0.765 |
| Sample 53 | Mg, Mn, Si, Y | 0.0448 | 0.765 |
| Sample 54 | Mg, Mn, Si, Y | 0.0448 | 0.765 |
| Sample 55 | Mg, Mn, Si, Y | 0.0448 | 0.765 |
| Sample 56 | Mg, Mn, Si, Y | 0.0448 | 0.765 |
| Sample 57 | Mg, Mn, Si, Y | 0.0448 | 0.765 |
| Sample 58 | Mg, Mn, Si, Y | 0.0448 | 0.765 |
| Sample 59 | Mg, Mn, Si, Y | 0.0448 | 0.765 |
| Sample 60 | Mg, Mn, Si, Y | 0.0448 | 0.765 |

TABLE 4

| Sample number | Crystal phase | Grain size [μm] | Dielectric constant 25° C. | Dielectric constant 200° C. | Change rate of electrostatic capacity [%] −55° C. | Change rate of electrostatic capacity [%] 200° C. | tanδ [%] 25° C. | tanδ [%] 200° C. |
|---|---|---|---|---|---|---|---|---|
| Sample 31 | T | 2.2 | 912.8 | 1296.2 | −43.3 | 42.0 | 3.6 | 4.8 |
| Sample 32 | T | 1.8 | 551.8 | 734.6 | −5.7 | 33.1 | 2.5 | 8.0 |
| Sample 33 | T | 1.7 | 564.3 | 762.3 | −6.0 | 35.1 | 2.6 | 7.4 |
| Sample 34 | T | 1.8 | 532.9 | 730.5 | −6.6 | 37.1 | 2.7 | 4.6 |
| Sample 35 | T | 1.9 | 614.6 | 857.8 | −5.7 | 39.6 | 2.4 | 6.0 |
| Sample 36 | T | 1.8 | 596.3 | 822.6 | −6.4 | 37.9 | 2.6 | 5.3 |
| Sample 37 | T | 2.5 | 430.4 | 634.8 | −14.4 | 47.5 | 1.9 | 6.8 |
| Sample 38 | T | 0.9 | 637.1 | 707.6 | −23.9 | 11.1 | 2.7 | 4.0 |
| Sample 39 | T | 1.1 | 123.0 | 107.9 | −15.3 | −12.3 | 1.5 | 5.8 |
| Sample 40 | T | 0.9 | 129.9 | 153.3 | 8.3 | 5.8 | 1.5 | 6.0 |
| Sample 41 | T | 2.3 | 702.7 | 1140.3 | −5.7 | 42.3 | 2.3 | 8.6 |
| Sample 42 | T | 2.6 | 200.4 | 206.2 | −33.1 | 48.1 | 4.7 | 9.8 |
| Sample 43 | T | 2.1 | 624.4 | 922.7 | −3.9 | 47.8 | 2.1 | 6.8 |
| Sample 44 | T | 2.3 | 630.8 | 1161.1 | −2.8 | 44.1 | 1.9 | 8.8 |
| Sample 45 | T | 2.0 | 776.2 | 1350.6 | 0.3 | 34.0 | 1.5 | 3.7 |
| Sample 46 | T | 1.1 | 205.4 | 210.5 | 10.2 | 9.5 | 3.6 | 7.1 |
| Sample 47 | T | 0.8 | 208.3 | 205.4 | −21.9 | 10.6 | 2.6 | 8.9 |
| Sample 48 | T | 2.1 | 294.8 | 397.6 | −12.3 | 26.1 | 3.8 | 9.1 |
| Sample 49 | T | 1.0 | 206.7 | 244.3 | −13.4 | −12.2 | 2.3 | 3.6 |
| Sample 50 | T | 1.1 | 220.2 | 258.9 | −12.9 | 13.7 | 2.1 | 3.1 |
| Sample 51 | T | 1.3 | 231.4 | 270.1 | −12.5 | 13.1 | 1.9 | 2.8 |
| Sample 52 | T | 1.2 | 243.6 | 281.3 | −11.4 | 12.8 | 1.7 | 2.5 |
| Sample 53 | T | 0.9 | 201.3 | 206.5 | −5.9 | 8.1 | 1.6 | 3.4 |
| Sample 54 | T | 1.0 | 209.6 | 201.3 | −6.6 | −8.6 | 2.8 | 5.1 |
| Sample 55 | T | 1.8 | 315.3 | 418.1 | −10.5 | 20.2 | 3.2 | 8.1 |
| Sample 56 | T | 1.4 | 401.4 | 435.2 | −23.4 | 13.0 | 2.3 | 6.3 |
| Sample 57 | T | 1.1 | 215.3 | 204.9 | 5.9 | 3.2 | 1.1 | 3.1 |
| Sample 58 | T | 1.2 | 424.5 | 410.3 | 2.8 | 1.6 | 0.6 | 1.5 |
| Sample 59 | T | 1.3 | 224.7 | 212.8 | 5.4 | 2.8 | 1.2 | 3.4 |
| Sample 60 | T | 1.2 | 206.1 | 213.6 | 5.8 | 3.1 | 0.9 | 1.8 |

TABLE 5

| Sample number | Composition in terms of oxide [mol %] CaO | SrO | BaO | $TiO_2$ | $ZrO_2$ | $SnO_2$ | $Nb_2O_5$ | $Ta_2O_5$ | $V_2O_5$ | Dielectric ceramic composition |
|---|---|---|---|---|---|---|---|---|---|---|
| Sample 61 | 0.0 | 17.5 | 32.5 | 16.7 | 0.0 | 0.0 | 33.3 | 0.0 | 0.0 | $Sr_{2.1}Ba_{3.9}Ti_2Nb_8O_{30}$ |
| Sample 62 | 6.7 | 6.7 | 36.7 | 16.7 | 0.0 | 0.0 | 33.3 | 0.0 | 0.0 | $Ca_{0.8}Sr_{0.8}Ba_{4.4}Ti_2Nb_8O_{30}$ |
| Sample 63 | 1.7 | 5.0 | 43.3 | 16.7 | 0.0 | 0.0 | 33.3 | 0.0 | 0.0 | $Ca_{0.2}Sr_{0.6}Ba_{5.2}Ti_2Nb_8O_{30}$ |
| Sample 64 | 17.5 | 2.5 | 30.0 | 16.7 | 0.0 | 0.0 | 33.3 | 0.0 | 0.0 | $Ca_{2.1}Sr_{0.3}Ba_{3.6}Ti_2Nb_8O_{30}$ |
| Sample 65 | 50.0 | 0.0 | 0.0 | 16.7 | 0.0 | 0.0 | 33.3 | 0.0 | 0.0 | $Ca_6Ti_2Nb_8O_{30}$ |
| Sample 66 | 40.0 | 5.0 | 5.0 | 16.7 | 0.0 | 0.0 | 33.3 | 0.0 | 0.0 | $Ca_{4.8}Sr_{0.6}Ba_{0.6}Ti_2Nb_8O_{30}$ |
| Sample 67 | 0.0 | 50.0 | 0.0 | 16.7 | 0.0 | 0.0 | 33.3 | 0.0 | 0.0 | $Sr_6Ti_2Nb_8O_{30}$ |
| Sample 68 | 0.0 | 0.0 | 50.0 | 0.0 | 0.0 | 0.0 | 50.0 | 0.0 | 0.0 | $BaNb_2O_6$ |
| Sample 69 | 0.0 | 50.0 | 0.0 | 0.0 | 0.0 | 0.0 | 50.0 | 0.0 | 0.0 | $SrNb_2O_6$ |
| Sample 70 | 50.0 | 0.0 | 0.0 | 0.0 | 0.0 | 0.0 | 50.0 | 0.0 | 0.0 | $CaNb_2O_6$ |
| Sample 71 | 0.0 | 0.0 | 48.3 | 17.2 | 0.0 | 0.0 | 34.5 | 0.0 | 0.0 | $Ba_{5.6}Ti_2Nb_8O_{30}$ |
| Sample 72 | 0.0 | 0.0 | 51.6 | 16.1 | 0.0 | 0.0 | 32.3 | 0.0 | 0.0 | $Ba_{6.4}Ti_2Nb_8O_{30}$ |
| Sample 73 | 16.1 | 32.1 | 0.0 | 17.3 | 0.0 | 0.0 | 34.5 | 0.0 | 0.0 | $Ca_{1.86}Sr_{3.72}Ti_2Nb_8O_{30}$ |
| Sample 74 | 17.1 | 34.4 | 0.0 | 16.2 | 0.0 | 0.0 | 32.3 | 0.0 | 0.0 | $Ca_{2.12}Sr_{4.26}Ti_2Nb_8O_{30}$ |
| Sample 75 | 16.7 | 33.3 | 0.0 | 13.3 | 0.0 | 3.3 | 33.3 | 0.0 | 0.0 | $Ca_2Sr_4Ti_{1.6}Sn_{0.4}Nb_8O_{30}$ |
| Sample 76 | 16.7 | 33.3 | 0.0 | 16.7 | 0.0 | 0.0 | 30.0 | 0.0 | 3.3 | $Ca_2Sr_4Ti_2Nb_{7.2}V_{0.8}O_{30}$ |
| Sample 77 | 16.7 | 33.3 | 0.0 | 15.0 | 0.0 | 1.7 | 30.0 | 0.0 | 3.3 | $Ca_2Sr_4Ti_{1.8}Sn_{0.2}Nb_{7.2}V_{0.8}O_{30}$ |
| Sample 78 | 16.7 | 33.3 | 0.0 | 16.7 | 0.0 | 0.0 | 33.3 | 0.0 | 0.0 | $Ca_2Sr_4Ti_2Nb_8O_{30}$ |
| Sample 79 | 16.7 | 16.7 | 16.7 | 16.7 | 0.0 | 0.0 | 33.3 | 0.0 | 0.0 | $Ca_2Sr_2Ba_2Ti_2Nb_8O_{30}$ |
| Sample 80 | 16.7 | 33.3 | 0.0 | 16.7 | 0.0 | 0.0 | 33.3 | 0.0 | 0.0 | $Ca_2Sr_4Ti_2Nb_8O_{30}$ |
| Sample 81 | 37.5 | 12.5 | 0.0 | 16.7 | 0.0 | 0.0 | 33.3 | 0.0 | 0.0 | $Ca_{4.5}Sr_{1.5}Ti_2Nb_8O_{30}$ |
| Sample 82 | 37.5 | 0.0 | 12.5 | 16.7 | 0.0 | 0.0 | 33.3 | 0.0 | 0.0 | $Ca_{4.5}Ba_{1.5}Ti_2Nb_8O_{30}$ |
| Sample 83 | 0.0 | 47.5 | 2.5 | 16.7 | 0.0 | 0.0 | 33.3 | 0.0 | 0.0 | $Sr_{5.7}Ba_{0.3}Ti_2Nb_8O_{30}$ |
| Sample 84 | 36.7 | 6.7 | 6.7 | 16.7 | 0.0 | 0.0 | 33.3 | 0.0 | 0.0 | $Ca_{4.4}Sr_{0.8}Ba_{0.8}Ti_2Nb_8O_{30}$ |
| Sample 85 | 37.5 | 10.0 | 2.5 | 16.7 | 0.0 | 0.0 | 33.3 | 0.0 | 0.0 | $Ca_{4.5}Sr_{1.2}Ba_{0.3}Ti_2Nb_8O_{30}$ |
| Sample 86 | 37.5 | 2.5 | 10.0 | 16.7 | 0.0 | 0.0 | 33.3 | 0.0 | 0.0 | $Ca_{4.5}Sr_{0.3}Ba_{1.2}Ti_2Nb_8O_{30}$ |
| Sample 87 | 30.0 | 0.0 | 20.0 | 16.7 | 0.0 | 0.0 | 33.3 | 0.0 | 0.0 | $Ca_{3.6}Ba_{2.4}Ti_2Nb_8O_{30}$ |
| Sample 88 | 6.7 | 1.7 | 41.7 | 16.7 | 0.0 | 0.0 | 33.3 | 0.0 | 0.0 | $Ca_{0.8}Sr_{0.2}Ba_5Ti_2Nb_8O_{30}$ |
| Sample 89 | 0.0 | 32.5 | 17.5 | 16.7 | 0.0 | 0.0 | 33.3 | 0.0 | 0.0 | $Sr_{3.9}Ba_{2.1}Ti_2Nb_8O_{30}$ |
| Sample 90 | 0.0 | 22.5 | 27.5 | 16.7 | 0.0 | 0.0 | 33.3 | 0.0 | 0.0 | $Sr_{2.7}Ba_{3.3}Ti_2Nb_8O_{30}$ |

TABLE 5-continued

| Sample number | Sub-components Composition in terms of oxide [mass %] | | |
|---|---|---|---|
| | Type of oxide component | MnO content | Total content of sub-components |
| Sample 61 | Mg, Mn, Si, Y | 0.0448 | 0.765 |
| Sample 62 | Mg, Mn, Si, Y | 0.0448 | 0.765 |
| Sample 63 | Mg, Mn, Si, Y | 0.0448 | 0.765 |
| Sample 64 | Mg, Mn, Si, Y | 0.0448 | 0.765 |
| Sample 65 | Mg, Mn, Si, Y | 0.0448 | 0.765 |
| Sample 66 | Mg, Mn, Si, Y | 0.0448 | 0.765 |
| Sample 67 | Mg, Mn, Si, Y | 0.0448 | 0.765 |
| Sample 68 | Mg, Mn, Si, Y | 0.0448 | 0.765 |
| Sample 69 | Mg, Mn, Si, Y | 0.0448 | 0.765 |
| Sample 70 | Mg, Mn, Si, Y | 0.0448 | 0.765 |
| Sample 71 | Mg, Mn, Si, Y | 0.0448 | 0.765 |
| Sample 72 | Mg, Mn, Si, Y | 0.0448 | 0.765 |
| Sample 73 | Mg, Mn, Si, Y | 0.0448 | 0.765 |
| Sample 74 | Mg, Mn, Si, Y | 0.0448 | 0.765 |
| Sample 75 | Mg, Mn, Si, Y | 0.0448 | 0.765 |
| Sample 76 | Mg, Mn, Si, Y | 0.0448 | 0.765 |
| Sample 77 | Mg, Mn, Si, Y | 0.0448 | 0.765 |
| Sample 78 | Mg, Si, Y | 0.0000 | 0.720 |
| Sample 79 | Mg, Si, Y | 0.0000 | 0.720 |
| Sample 80 | Mg, Mn, Si, Y | 5.0710 | 5.791 |
| Sample 81 | Mg, Mn, Si, Y | 0.0448 | 0.765 |
| Sample 82 | Mg, Mn, Si, Y | 0.0448 | 0.765 |
| Sample 83 | Mg, Mn, Si, Y | 0.0448 | 0.765 |
| Sample 84 | Mg, Mn, Si, Y | 0.0448 | 0.765 |
| Sample 85 | Mg, Mn, Si, Y | 0.0448 | 0.765 |
| Sample 86 | Mg, Mn, Si, Y | 0.0448 | 0.765 |
| Sample 87 | Mg, Mn, Si, Y | 0.0448 | 0.765 |
| Sample 88 | Mg, Mn, Si, Y | 0.0448 | 0.765 |
| Sample 89 | Mg, Mn, Si, Y | 0.0448 | 0.765 |
| Sample 90 | Mg, Mn, Si, Y | 0.0448 | 0.765 |

TABLE 6

| Sample number | Crystal phase | Grain size [μm] | Dielectric constant | | Change rate of electrostatic capacity [%] | | tanδ [%] | |
|---|---|---|---|---|---|---|---|---|
| | | | 25° C. | 200° C. | −55° C. | 200° C. | 25° C. | 200° C. |
| Sample 61 | T | 1.7 | 231.4 | 245.3 | 7.5 | −16.4 | 1.1 | 2.1 |
| Sample 62 | T | 1.8 | 238.2 | 215.4 | 12.6 | −22.3 | 2.1 | 3.6 |
| Sample 63 | T | 1.4 | 459.5 | 345.2 | −19.7 | 26.5 | 1.5 | 4.4 |
| Sample 64 | T | 1.5 | 311.1 | 394.4 | −22.7 | 27.4 | 3.7 | 5.9 |
| Sample 65 | T | 0.5 | 44.0 | 61.7 | −18.9 | 40.3 | 5.1 | 10.9 |
| Sample 66 | T | 0.6 | 135.1 | 244.5 | −12.9 | 81.0 | 2.2 | 27.2 |
| Sample 67 | T | 0.7 | 86.8 | 84.4 | −12.9 | −2.8 | 2.8 | 14.6 |
| Sample 68 | T | 1.8 | 51.7 | 482.7 | 1.2 | 833.3 | 5.6 | 56.1 |
| Sample 69 | T | 1.6 | 101.6 | 54.3 | −52.2 | −46.5 | 39.4 | 0.1 |
| Sample 70 | T | 0.9 | 57.1 | 43.0 | −24.6 | −24.7 | 26.7 | 0.1 |
| Sample 71 | T | 1.3 | 611.6 | 994.7 | −6.6 | 62.6 | 2.1 | 18.8 |
| Sample 72 | T | 1.2 | 715.3 | 997.4 | −7.0 | 39.4 | 2.3 | 14.6 |
| Sample 73 | T | 2.3 | 717.7 | 957.7 | −6.2 | 33.4 | 2.5 | 11.7 |
| Sample 74 | T | 3.1 | 525.0 | 757.2 | −4.1 | 44.2 | 2.8 | 16.8 |
| Sample 75 | T | 2.5 | 986.8 | 4909.9 | −23.7 | 397.5 | 3.7 | 84.3 |
| Sample 76 | T | 2.4 | 2555.1 | N.D. | N.D. | N.D. | 64.0 | N.D. |
| Sample 77 | T | 4.1 | 1269.0 | 2886.4 | −50.7 | 127.5 | 28.7 | 90.9 |
| Sample 78 | T | 2.2 | 713.2 | 1158.0 | −5.4 | 62.4 | 2.8 | 18.9 |
| Sample 79 | T | 1.9 | 310.4 | 335.2 | −10.5 | 59.6 | 6.5 | 15.8 |
| Sample 80 | T | 2.8 | 257.2 | 281.5 | −15.7 | 62.3 | 9.8 | 12.1 |
| Sample 81 | T | 0.7 | 125.2 | 183.4 | −10.3 | 61.1 | 2.9 | 17.0 |
| Sample 82 | T | 2.0 | 80.3 | 83.4 | −19.1 | 30.2 | 4.6 | 10.1 |
| Sample 83 | T | 0.8 | 94.8 | 92.4 | −25.8 | −4.9 | 5.6 | 21.5 |
| Sample 84 | T | 0.7 | 102.5 | 133.6 | −7.5 | 60.5 | 3.3 | 13.4 |
| Sample 85 | T | 0.8 | 113.8 | 158.5 | −8.6 | 60.8 | 3.1 | 15.2 |
| Sample 86 | T | 1.4 | 90.4 | 108.5 | −13.6 | 50.6 | 3.9 | 11.8 |
| Sample 87 | T | 1.6 | 102.9 | 106.1 | −22.9 | 6.1 | 4.1 | 7.7 |
| Sample 88 | T | 1.1 | 180.1 | 189.8 | −14.5 | 20.1 | 5.0 | 9.1 |
| Sample 89 | T | 1.5 | 188.9 | 175.3 | 6.6 | 3.8 | 4.9 | 7.8 |
| Sample 90 | T | 1.2 | 171.4 | 162.6 | −4.5 | −6.9 | 5.1 | 8.0 |

(3) Evaluation

From the above analysis results, the sample existing in the region surrounded by the line segments joining A-B-C-D-E in FIG. 1 had a dielectric constant at 25° C. of 100 or more. That is, it was confirmed that the dielectric ceramic composition of the present invention had ferroelectricity. Further, the sample corresponding to the region surrounded by the line segments joining A-B-C-D-E in FIG. 1 has a change rate of electrostatic capacity in a temperature range of −55° C. to 200° C. of ±50%, and the dielectric losses (tan δ) at 25° C. and 200° C. are 10%/or less.

Further, the sample corresponding to the region surrounded by the line segments joining point A'-point B'-point C'-point D'-point E'-point F'-point G'-point H'-point I'-point J'-point K', and point L' in FIG. 2 had a dielectric constant at 25° C. of 200 or more.

Among others, Sample Nos. 5, 8, 12, 15, 17, 18, 23 to 25, 27, 29 to 36, 38, 41 and 43 to 45 are particularly preferable, because they exhibit a dielectric constant of 500 or more.

Sample Nos. 1 to 4, 7 to 13, 16 to 18, 23 to 28, 38 to 40, 46, 47, 49 to 62, and 87 to 90 exhibit a change rate of electrostatic capacity $\Delta C/C_{25}$ of −33% to +22% in a temperature range from −55° C. to 200° C., indicating particularly excellent temperature characteristics.

In contrast, for Samples Nos. 65 to 86, which are outside the scope of the present invention, favorable characteristics were not obtained with respect to one or more functions of dielectric constant, change rate of the electrostatic capacity, and tan δ.

Further, as shown in FIG. 6, it is found that when a dielectric ceramic composition of the present invention (Samples 8 and 15) is used, the change rate of the electrostatic capacity falls within the range of −30% to 30% in the temperature range from −55° C. to 200° C., but in the case of Sample 66, which is outside the scope of the present invention, the change rate of the electrostatic capacity increases rapidly around 150° C. or higher.

Samples 15 and 78 differ only in the presence or absence of an oxide of Mn as the second component, but as shown in FIG. 7, the characteristics of the two are significantly different.

Example 2

Samples 91 to 107 were prepared in the same manner as in Example 1 except that the above-mentioned raw materials for the first component were weighed so as to meet the composition in terms of oxides set forth in Table 7, and further $MnCO_3$ and $SiO_2$ were weighed as the raw materials for the second component so as to meet the composition in terms of oxides set forth in Table 7. A disk-shaped ceramic capacitor corresponding to each of the samples was obtained.

Then, the grain size, the crystal phase, the dielectric constant, the change rate of the electrostatic capacity, and the dielectric loss (tan δ) were measured in the same manner as in Example 1, and the results are shown in Table 8.

As obvious from these results, it is found that when the Mn content in terms of MnO as the second component based on the total mass of the first component in terms of oxides is 3.5 mass % or less, the results of the dielectric constant, the change rate of the electrostatic capacity, and the tan δ are satisfactory.

TABLE 7

| Sample number | Main component Composition in terms of oxide [mol %] | | | | | | | | | Dielectric ceramic composition |
|---|---|---|---|---|---|---|---|---|---|---|
| | CaO | SrO | BaO | $TiO_2$ | $ZrO_2$ | $SnO_2$ | $Nb_2O_5$ | $Ta_2O_5$ | $V_2O_5$ | |
| Sample 91  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 92  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 93  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 94  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 95  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 96  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 97  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 98  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 99  | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 100 | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 101 | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 102 | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 103 | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 104 | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 105 | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 106 | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |
| Sample 107 | 12.5 | 33.3 | 4.2 | 15.0 | 1.7 | 0.0 | 30.0 | 3.3 | 0.0 | $Ca_{1.5}Sr_4Ba_{0.5}Ti_{1.8}Zr_{0.2}Nb_{7.2}Ta_{0.8}O_{30}$ |

| Sample number | Sub-components Composition in terms of oxide [mass %] | | |
|---|---|---|---|
| | Type of oxide component | MnO content | Total content of sub-components |
| Sample 91  | Mn, Si | 0.6172 | 0.917 |
| Sample 92  | Mn, Si | 0.9258 | 1.226 |
| Sample 93  | Mn, Si | 1.2344 | 1.534 |
| Sample 94  | Mn, Si | 3.0860 | 3.386 |
| Sample 95  | Mn, Si | 3.3946 | 3.695 |
| Sample 96  | Mn, Si | 3.6414 | 3.941 |
| Sample 97  | Mn, Si | 0.9258 | 1.426 |
| Sample 98  | Mn, Si | 1.2344 | 1.734 |
| Sample 99  | Mn, Si | 3.0860 | 3.586 |
| Sample 100 | Mn, Si | 3.3946 | 3.895 |
| Sample 101 | Mn, Si | 3.6414 | 4.141 |

TABLE 7-continued

| | | | |
|---|---|---|---|
| Sample 102 | Mn, Si | 0.6172 | 1.317 |
| Sample 103 | Mn, Si | 0.9258 | 1.626 |
| Sample 104 | Mn, Si | 1.2344 | 1.934 |
| Sample 105 | Mn, Si | 3.0860 | 3.786 |
| Sample 106 | Mn, Si | 3.3946 | 4.095 |
| Sample 107 | Mn, Si | 3.6414 | 4.341 |

TABLE 8

| Sample number | Crystal phase | Grain size [μm] | Dielectric constant 25° C. | Dielectric constant 200° C. | Change rate of electrostatic capacity [%] −55° C. | Change rate of electrostatic capacity [%] 200° C. | tanδ [%] 25° C. | tanδ [%] 200° C. |
|---|---|---|---|---|---|---|---|---|
| Sample 91 | T | 1.5 | 965.7 | 932.3 | −17.0 | −3.5 | 1.5 | 1.6 |
| Sample 92 | T | 1.8 | 953.9 | 921.4 | −18.7 | −3.4 | 1.3 | 5.2 |
| Sample 93 | T | 1.5 | 886.3 | 687.2 | −18.7 | −22.5 | 4.0 | 1.6 |
| Sample 94 | T | 1.6 | 869.5 | 750.6 | −17.6 | −13.7 | 1.8 | 5.6 |
| Sample 95 | T | 1.8 | 842.6 | 631.8 | −16.2 | −20.3 | 2.2 | 8.3 |
| Sample 96 | T | 2.0 | 767.1 | 582.4 | −12.3 | −27.9 | 2.8 | 12.4 |
| Sample 97 | T | 2.5 | 981.3 | 935.7 | −19.1 | −4.6 | 1.5 | 2.4 |
| Sample 98 | T | 2.2 | 1011.8 | 985.1 | −20.6 | −2.6 | 2.0 | 2.1 |
| Sample 99 | T | 1.6 | 805.1 | 713.3 | −17.5 | −11.4 | 1.2 | 6.3 |
| Sample 100 | T | 1.5 | 738.6 | 573.3 | −16.3 | −18.2 | 2.3 | 9.5 |
| Sample 101 | T | 1.3 | 627.8 | 446.6 | −15.8 | −30.7 | 2.7 | 15.8 |
| Sample 102 | T | 1.3 | 988.6 | 952.3 | −20.7 | −3.7 | 2.3 | 1.2 |
| Sample 103 | T | 3.5 | 973.5 | 924.6 | −20.8 | −5.0 | 2.1 | 2.3 |
| Sample 104 | T | 4.4 | 972.1 | 921.3 | −21.2 | −5.2 | 1.8 | 1.9 |
| Sample 105 | T | 4.5 | 804.0 | 717.7 | −18.8 | −10.7 | 2.1 | 7.1 |
| Sample 106 | T | 4.8 | 725.2 | 586.3 | −17.2 | −16.9 | 2.6 | 9.8 |
| Sample 107 | T | 5.1 | 584.7 | 488.1 | −14.4 | −29.3 | 2.9 | 17.2 |

Although the single plate type ceramic capacitors were evaluated in the above examples, similar results can also be obtained with respect to a laminated ceramic capacitor, in which dielectric layers and internal electrodes are laminated.

REFERENCE CHARACTERS LIST

1 Laminated ceramic capacitor
2 Dielectric layer
3 Internal electrode layer
4 External electrode
10 Laminated body

The invention claimed is:

1. A dielectric ceramic composition comprising a first component and a second component, wherein:
the dielectric ceramic composition is a sintered compact obtained by mixing a dielectric raw material for the first component obtained by calcining starting materials for the first component and a raw material for the second component, and firing them;
the first component comprises: an oxide of Ca in a content of 0 to 35.85 mol % in terms of CaO; an oxide of Sr in a content of 0 to 47.12 mol % in terms of SrO; an oxide of Ba in a content of 0 to 51.22 mol % in terms of BaO; an oxide of Ti in a content of 0 to 17.36 mol % in terms of $TiO_2$; an oxide of Zr in a content of 0 to 17.36 mol % in terms of $ZrO_2$; an oxide of Sn in a content of 0 to 2.60 mol % in terms of $SnO_2$; an oxide of Nb in a content of 0 to 35.32 mol % in terms of $Nb_2O_5$; an oxide of Ta in a content of 0 to 35.32 mol % in terms of $Ta_2O_5$; and an oxide of V in a content of 0 to 2.65 mol % in terms of $V_2O_5$, at the specified content based on the total number of moles of the first component in terms of the above oxides;
the first component comprises at least one selected from the oxide of Ca, the oxide of Sr, and the oxide of Ba, at least one selected from the oxide of Ti and the oxide of Zr, and at least one selected from the oxide of Nb and the oxide of Ta; and wherein, based on a total number of moles of the first component in terms of the above oxides, a total content of the oxide of Ca in terms of CaO, the oxide of Sr in terms of SrO, and the oxide of Ba in terms of BaO is 48.72 to 51.22 mol %; a total content of the oxide of Ti in terms of $TiO_2$, the oxide of Zr in terms of $ZrO_2$, and the oxide of Sn in terms of $SnO_2$ is 15.97 to 17.36 mol %; and a total content of the oxide of Nb in terms of $Nb_2O_5$, the oxide of Ta in terms of $Ta_2O_5$, and the oxide of V in terms of $V_2O_5$ is 31.42 to 35.31 mol %; and
the dielectric ceramic composition comprises at least an oxide of Mn in a content of more than 0% by mass and 3.5% by mass or less in terms of MnO with respect to the total mass of the first component in terms of the above oxides as the second component.

2. A dielectric ceramic composition comprising a first component and a second component, wherein
the dielectric ceramic composition is a sintered compact obtained by mixing a dielectric raw material for the first component obtained by calcining starting materials for the first component and a raw material for the second component, and firing them;
the dielectric ceramic composition comprises a compound represented by Formula (1):

$$A_a M^1_b M^2_c O_d \qquad (1)$$

wherein A is represented by Formula (2):

$$Ba_{1-x-y}Sr_xCa_y \qquad (2),$$

wherein 0≤x≤0.920 and 0≤y≤0.700; $M^1$ is at least one selected from Ti and Zr, and optionally Sn; and $M^2$ is at least one selected from Nb and Ta, and optionally V; and 5.70≤a≤6.30, 1.90≤b≤2.10, 7.20≤c≤8.80, and 27.45≤d≤32.50; provided that when Sn is contained, a content of an oxide of Sn in terms of $SnO_2$ based on a total number of moles of an oxide of Ti in terms of $TiO_2$, an oxide of Zr in terms of $ZrO_2$, and the oxide of Sn in terms of $SnO_2$ is 15 mol % or less; and when V is contained, a content of an oxide of V in terms of $V_2O_5$ based on a total number of moles of an oxide of Nb in terms of $Nb_2O_5$, an oxide of Ta in terms of $Ta_2O_5$, and the oxide of V in terms of $V_2O_5$ is 7.5 mol % or less, as the first component; and the dielectric ceramic composition comprises an oxide of Mn in a content of more than 0% by mass and 3.5% by mass or less in terms of MnO with respect to the total mass of the compound represented by the Formula (1) in terms of the above oxides as the second component.

3. A dielectric ceramic composition comprising a first component and a second component, wherein:

the dielectric ceramic composition is a sintered compact obtained by mixing a dielectric raw material for the first component obtained by calcining starting materials for the first component and a raw material for the second component, and firing them;

the dielectric ceramic composition comprises a compound represented by Formula (3):

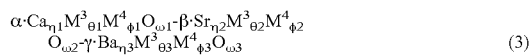

$\alpha \cdot Ca_{\eta 1}M^3_{\theta 1}M^4_{\phi 1}O_{\omega 1} - \beta \cdot Sr_{\eta 2}M^3_{\theta 2}M^4_{\phi 2}O_{\omega 2} - \gamma \cdot Ba_{\eta 3}M^3_{\theta 3}M^4_{\phi 3}O_{\omega 3}$ (3)

wherein η1, η2, and η3 are each independently a value within a range of 5.70 to 6.30; θ1, θ2, and θ3 are each independently a value within a range of 0.95 to 1.05; φ1, φ2, and φ3 are each independently a value within a range of 0.90 to 1.10; ω1, ω2, and ω3 are each independently a value within a range of 27.45 to 32.50; $M^3$ is represented by Formula (4): $Ti_{2-\rho-\sigma}Zr_\rho Sn_\sigma$(4), wherein 0≤ρ≤2.0 and 0≤σ≤0.3; $M^4$ is represented by Formula (5): $Nb_{8-\pi-\phi}Ta_\pi V_\phi$ (5), wherein 0≤π≤8.0 and 0≤φ≤0.6; α, β, and γ satisfy α+β+γ=1.00; and wherein, when an arbitrary point on a ternary composition diagram is expressed as (α, β, γ), the compound exists in a region surrounded by line segments joining point A=(0.05, 0.95, 0.00), point B=(0.70, 0.30, 0.00), point C=(0.70, 0.00, 0.30), point D=(0.00, 0.00, 1.00), and point E=(0.00, 0.90, 0.10), as the first component; and the dielectric ceramic composition comprises an oxide of Mn in a content of more than 0% by mass and 3.5% by mass or less in terms of MnO based on a mass of the compound existing in the region surrounded by the line segments joining the point A, the point B, the point C, the point D, and the point E on the ternary composition diagram as the second component.

4. The dielectric ceramic composition according to claim 3, wherein the first component is a compound existing in a region surrounded by the line segments joining point A'=(0.05, 0.95, 0.00), point B'=(0.60, 0.40, 0.00), point C'=(0.70, 0.20, 0.10), point D'=(0.70, 0.10, 0.20), point E'=(0.55, 0.00, 0.45), point F'=(0.40, 0.00, 0.60), point G'=(0.10, 0.10, 0.80), point H'=(0.00, 0.00, 1.00), point I'=(0.00, 0.40, 0.60), point J'=(0.20, 0.40, 0.40), point K'=(0.00, 0.70, 0.30), and point L'=(0.00, 0.90, 0.10) in the ternary composition diagram.

5. The dielectric ceramic composition according to any one of claims 1, 2, and 3, comprising the oxide of Mn and an oxide of D, wherein D is at least one selected from Li, Mg, Si, Cr, Al, Fe, Co, Ni, Cu, Zn, Ga, Ge, In, W, Mo, Y, Hf, La, Ce, Pr, Nd, Sm, Eu, Gd, Tb, Dy, Ho, Er, Tm, Yb, and Lu, as the second component.

6. The dielectric ceramic composition according to any one of claims 1, 2, and 3, having a tungsten bronze-type crystal phase.

7. The dielectric ceramic composition according to claim 1, wherein a dielectric constant at 25° C. is 100 or more.

8. The dielectric ceramic composition according to claim 7, wherein the dielectric constant at 25° C. is 200 or more.

9. The dielectric ceramic composition according to claim 8, wherein the dielectric constant at 25° C. is 300 or more.

10. The dielectric ceramic composition according to claim 1, wherein a change rate of electrostatic capacity in a temperature range of −55° C. to 200° C. is in a range of −50% to 50%.

11. The dielectric ceramic composition according to claim 10, wherein a change rate of the electrostatic capacity in a temperature range of −55° C. to 200° C. is in a range of −33% to 22%.

12. The dielectric ceramic composition according to claim 1, wherein a dielectric loss (tan δ) at 25° C. is 10% or less, and a dielectric loss (tan δ) at 200° C. is 10% or less.

13. A ceramic electronic component comprising a dielectric layer formed of the dielectric ceramic composition according to claim 1, and an electrode layer containing a base metal as a conductive component.

14. The ceramic electronic component according to claim 13, wherein the base metal is at least one selected from nickel and copper.

15. The ceramic electronic component according to claim 13, wherein a plurality of the dielectric layers and a plurality of the electrode layers are laminated.

16. The dielectric ceramic composition according to claim 5, wherein the oxide of D is at least one selected from an oxide of Mg, an oxide of Si, and an oxide of Y.

17. The dielectric ceramic composition according to claim 16, wherein a ratio of a total mass of the oxide of Mn in terms of MnO and the oxide of D based on a total mass of the first component in terms of the above oxides is 6% by mass or less.

* * * * *